(12) United States Patent     (10) Patent No.:   US 12,677,349 B2
Nhan et al.     (45) Date of Patent:     Jul. 7, 2026

(54) BALANCING LATENCY REDUCTION AND USER EQUIPMENT POWER SAVING

(71) Applicant: Nokia Technologies Oy, Espoo (FI)

(72) Inventors: Nhat-Quang Nhan, Massy (FR); Jorma Johannes Kaikkonen, Oulu (FI); Marco Maso, Massy (FR); Karri Markus Ranta-Aho, Espoo (FI); John Harris, Whitefish Bay, WI (US)

(73) Assignee: Nokia Technologies Oy, Espoo (FI)

( * ) Notice: Subject to any disclaimer, the term of this patent is extended or adjusted under 35 U.S.C. 154(b) by 307 days.

(21) Appl. No.: 18/598,698

(22) Filed: Mar. 7, 2024

(65) Prior Publication Data

US 2024/0341000 A1     Oct. 10, 2024

Related U.S. Application Data

(60) Provisional application No. 63/457,963, filed on Apr. 7, 2023.

(51) Int. Cl.
*H04W 76/28*     (2018.01)
*H04L 1/1812*     (2023.01)
*H04L 1/1829*     (2023.01)

(52) U.S. Cl.
CPC ........... *H04W 76/28* (2018.02); *H04L 1/1819* (2013.01); *H04L 1/1854* (2013.01)

(58) Field of Classification Search
CPC ............. H04W 76/28; H04W 52/0216; H04W 52/0222; H04L 1/1819; H04L 1/1854
See application file for complete search history.

(56) References Cited

U.S. PATENT DOCUMENTS

2017/0134124 A1*   5/2017   Lee ....................... H04W 72/23
2019/0239097 A1   8/2019   Meylan et al.
2020/0205074 A1*   6/2020   Ozturk .............. H04W 52/0209
(Continued)

FOREIGN PATENT DOCUMENTS

CN     114451064 A   *   5/2022   ............. H04W 72/23
CN     117641527 A   *   3/2024   ........... H04L 1/1851
(Continued)

OTHER PUBLICATIONS

"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.
(Continued)

*Primary Examiner* — Sujoy K Kundu
*Assistant Examiner* — Vladislav Y Agureyev
(74) *Attorney, Agent, or Firm* — Barta Jones, PLLC

(57) ABSTRACT

Balancing latency reduction and user equipment power saving is provided. A method for balancing latency reduction and user equipment power saving may include receiving, from a network entity, an indication of a number of repetitions of an uplink channel and determine at least one duration of at least one timer based on at least the number of repetitions. The method may further transmit the uplink channel with the number of repetitions and starts the timer and determine, based on an expiration status of the at least one timer, a discontinuous reception state of the apparatus comprising a plurality of active and inactive states.

20 Claims, 13 Drawing Sheets

(56) References Cited

U.S. PATENT DOCUMENTS

| | | | | |
|---|---|---|---|---|
| 2020/0367167 A1* | 11/2020 | Nam | | H04W 76/28 |
| 2021/0022158 A1* | 1/2021 | Wei | | H04L 1/08 |
| 2021/0377862 A1* | 12/2021 | Agarwal | | H04W 52/0229 |
| 2021/0410098 A1* | 12/2021 | Bao | | H04W 64/00 |
| 2022/0015187 A1* | 1/2022 | Huang | | H04W 72/1268 |
| 2022/0046682 A1* | 2/2022 | Zhang | | H04W 72/1268 |
| 2022/0070835 A1* | 3/2022 | Khoshnevisan | | H04W 52/0216 |
| 2022/0094484 A1* | 3/2022 | Babaei | | H04W 72/1263 |
| 2022/0110184 A1* | 4/2022 | Jeon | | H04L 1/0015 |
| 2022/0225467 A1* | 7/2022 | Shrestha | | H04L 47/283 |
| 2022/0232596 A1* | 7/2022 | Lu | | H04W 76/28 |
| 2022/0232668 A1* | 7/2022 | Park | | H04W 68/005 |
| 2022/0264616 A1* | 8/2022 | Shah | | H04L 1/08 |
| 2022/0312389 A1* | 9/2022 | Li | | H04W 72/02 |
| 2023/0047579 A1* | 2/2023 | Zhang | | H04L 1/1883 |
| 2023/0063082 A1* | 3/2023 | Zhou | | H04L 1/1851 |
| 2023/0156857 A1* | 5/2023 | Hong | | H04W 52/028 |
| | | | | 370/328 |
| 2023/0247550 A1* | 8/2023 | Yu | | H04W 52/0216 |
| | | | | 370/311 |
| 2023/0300797 A1* | 9/2023 | Park | | H04W 72/02 |
| | | | | 370/329 |
| 2023/0345576 A1* | 10/2023 | Lee | | H04L 27/26025 |
| 2023/0345577 A1* | 10/2023 | Yu | | H04W 76/28 |
| 2024/0057213 A1* | 2/2024 | Yu | | H04W 76/28 |
| 2024/0080771 A1* | 3/2024 | Jung | | H04W 76/28 |
| 2024/0155643 A1* | 5/2024 | Khoshkholgh Dashtaki | | H04L 1/1822 |
| 2024/0224376 A1* | 7/2024 | Yang | | H04W 52/0216 |
| 2024/0306245 A1* | 9/2024 | Zorgui | | H04W 52/0229 |
| 2024/0340999 A1* | 10/2024 | He | | H04W 76/28 |
| 2024/0356680 A1* | 10/2024 | Di Girolamo | | H04L 1/1822 |
| 2025/0008431 A1* | 1/2025 | Lai | | H04L 5/001 |
| 2025/0212290 A1* | 6/2025 | Tsai | | H04L 1/1812 |
| 2025/0220522 A1* | 7/2025 | Xu | | H04W 36/0072 |
| 2025/0247916 A1* | 7/2025 | Lu | | H04W 52/02 |

FOREIGN PATENT DOCUMENTS

| | | | | | |
|---|---|---|---|---|---|
| CN | 117812674 A | * | 4/2024 | | H04W 52/0248 |
| CN | 118019088 A | * | 5/2024 | | H04W 68/02 |
| EP | 4615153 A1 | * | 9/2025 | | H04W 76/28 |
| GB | 2628669 A | * | 10/2024 | | H04W 52/0206 |
| WO | 2017/078299 A1 | | 5/2017 | | |
| WO | WO-2021003628 A1 | * | 1/2021 | | H04W 72/04 |
| WO | WO-2022212731 A1 | * | 10/2022 | | H04L 1/1896 |
| WO | WO-2023068801 A1 | * | 4/2023 | | H04L 1/188 |
| WO | WO-2024092576 A1 | * | 5/2024 | | H04W 76/28 |

OTHER PUBLICATIONS

"3rd Generation Partnership Project; Technical Specification Group Radio Access Network; NR; Physical layer procedures for control (Release 17)", 3GPP TS 38.213, V17.4.0, Dec. 2022, pp. 1-258.

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

"5G NR: Connected Mode DRX", How LTE Stuff Works?, Retrieved on Apr. 1, 2024, Webpage available at : https://howltestuffworks. blogspot.com/2021/04/5g-nr-connected-mode-drx.html.

Extended European Search Report received for corresponding European Patent Application No. 24154301.6, dated Jul. 22, 2024, 7 pages.

"3rd Generation Partnership Project, Technical Specification Group Radio Access Network; Evolved Universal Terrestrial Radio Access (E-UTRA); Medium Access Control (MAC) protocol specification (Release 15)", 3GPP TS 36.321, V15.1.0, Mar. 2018, pp. 1-109.

* cited by examiner

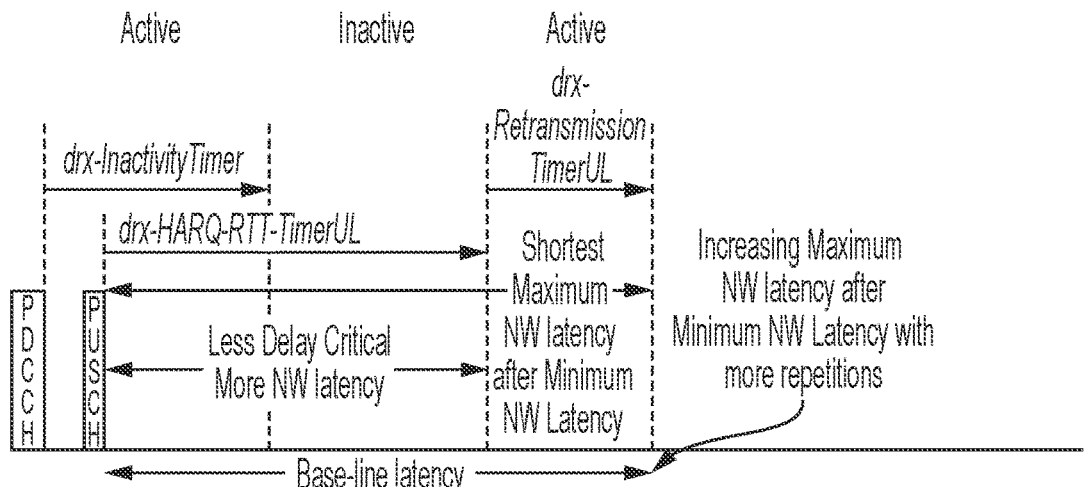
FIG. 11A
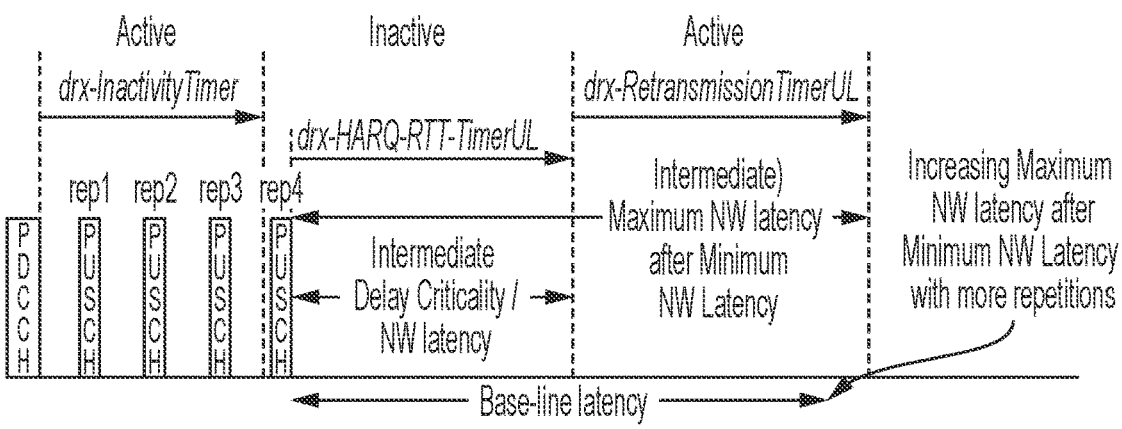
FIG. 11B
FIG. 11C

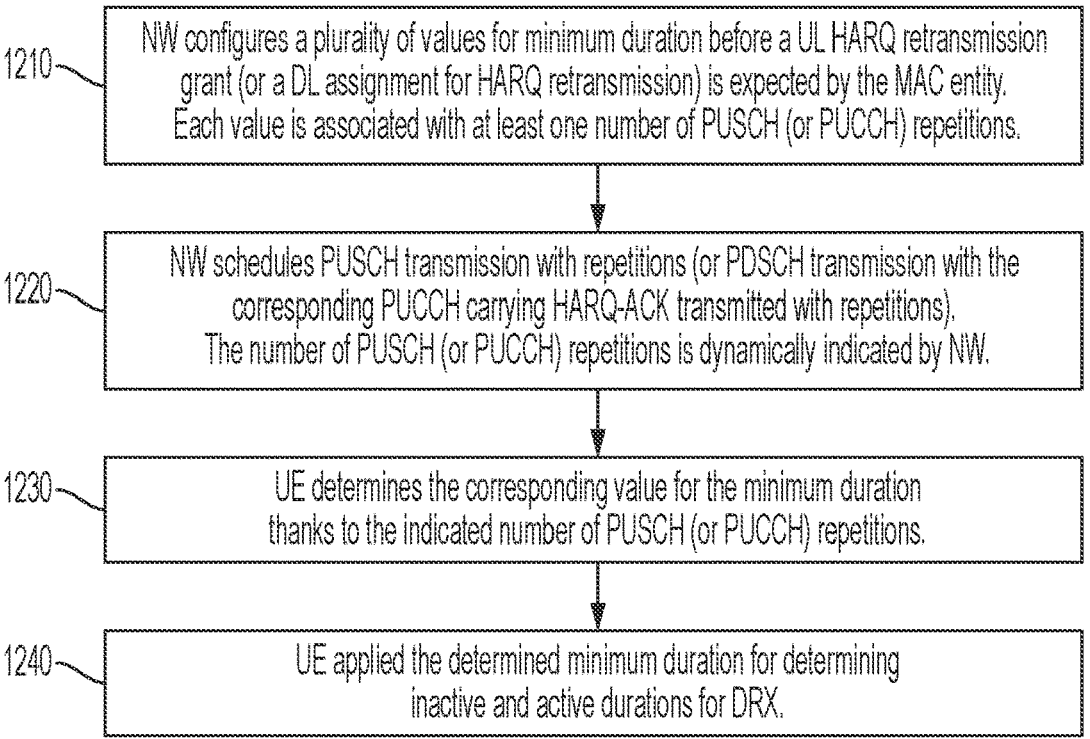

1210 — NW configures a plurality of values for minimum duration before a UL HARQ retransmission grant (or a DL assignment for HARQ retransmission) is expected by the MAC entity. Each value is associated with at least one number of PUSCH (or PUCCH) repetitions.

1220 — NW schedules PUSCH transmission with repetitions (or PDSCH transmission with the corresponding PUCCH carrying HARQ-ACK transmitted with repetitions). The number of PUSCH (or PUCCH) repetitions is dynamically indicated by NW.

1230 — UE determines the corresponding value for the minimum duration thanks to the indicated number of PUSCH (or PUCCH) repetitions.

1240 — UE applied the determined minimum duration for determining inactive and active durations for DRX.

FIG. 12

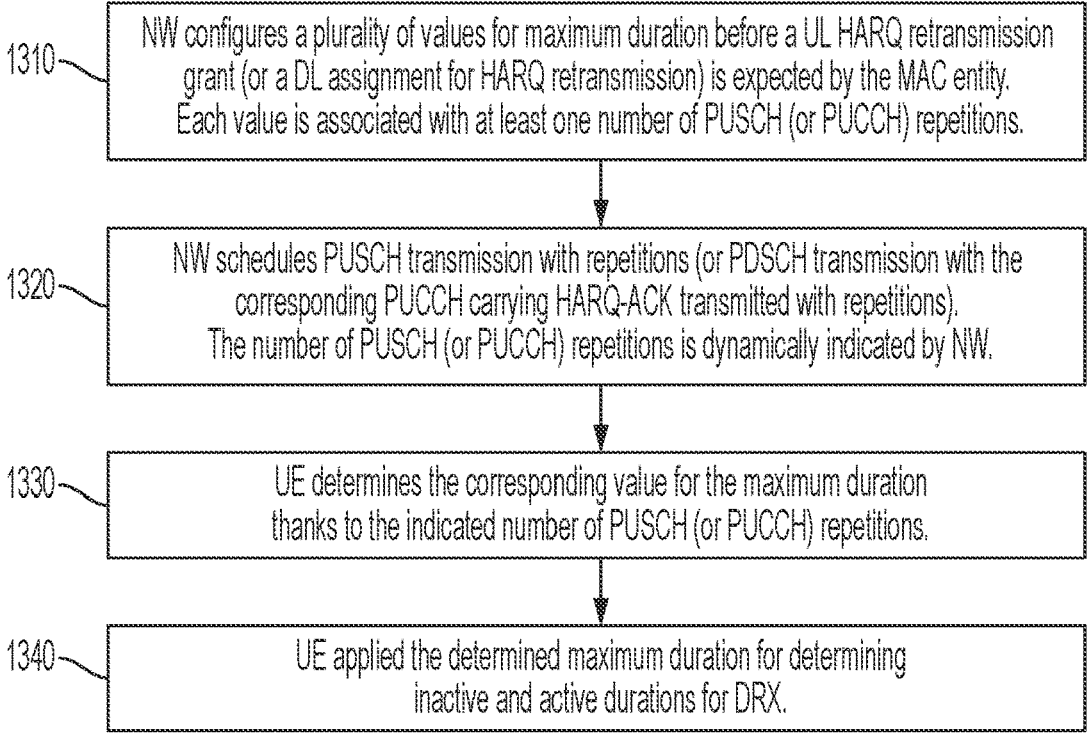

1310 — NW configures a plurality of values for maximum duration before a UL HARQ retransmission grant (or a DL assignment for HARQ retransmission) is expected by the MAC entity. Each value is associated with at least one number of PUSCH (or PUCCH) repetitions.

1320 — NW schedules PUSCH transmission with repetitions (or PDSCH transmission with the corresponding PUCCH carrying HARQ-ACK transmitted with repetitions). The number of PUSCH (or PUCCH) repetitions is dynamically indicated by NW.

1330 — UE determines the corresponding value for the maximum duration thanks to the indicated number of PUSCH (or PUCCH) repetitions.

1340 — UE applied the determined maximum duration for determining inactive and active durations for DRX.

FIG. 13

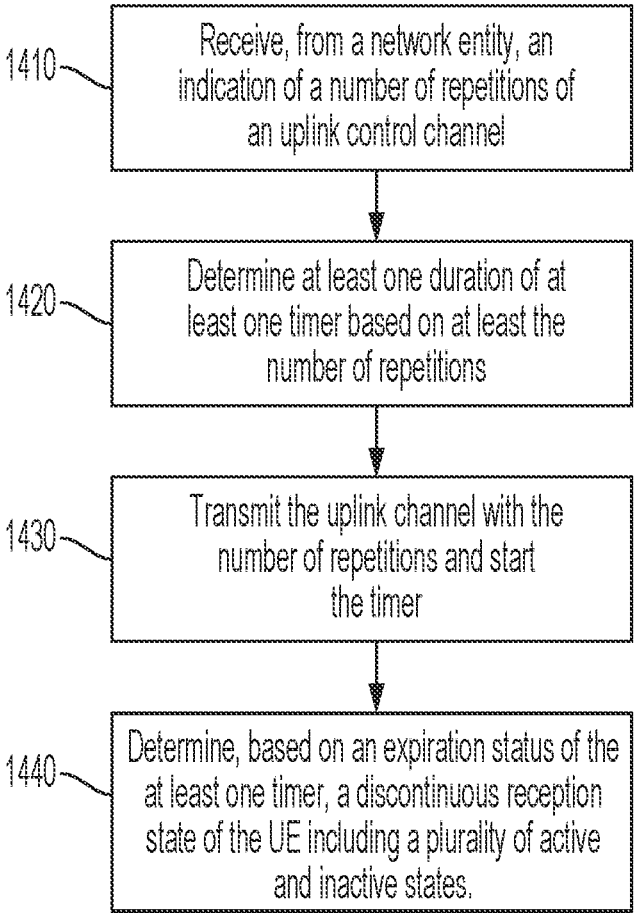

1410 — Receive, from a network entity, an indication of a number of repetitions of an uplink control channel 1420 — Determine at least one duration of at least one timer based on at least the number of repetitions 1430 — Transmit the uplink channel with the number of repetitions and start the timer 1440 — Determine, based on an expiration status of the at least one timer, a discontinuous reception state of the UE including a plurality of active and inactive states.

FIG. 14

BALANCING LATENCY REDUCTION AND USER EQUIPMENT POWER SAVING

CROSS-REFERENCE TO RELATED APPLICATION

This application claims the benefit of U.S. Provisional Application No. 63/457,963, filed Apr. 7, 2023. The entire content of the above-referenced application is hereby incorporated by reference.

TECHNICAL FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to balancing latency reduction and user equipment power saving.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Various exemplary embodiments may provide an apparatus including at least one processor and at least one memory storing instructions. The instructions, when executed by the at least one processor, cause the apparatus at least to receive, from a network entity, an indication of a number of repetitions of an uplink channel and determine at least one duration of at least one timer based on at least the number of repetitions. The apparatus may also be caused to transmit the uplink channel with the number of repetitions and start the timer, and determine, based on an expiration status of the at least one timer, a discontinuous reception state of the apparatus comprising a plurality of active and inactive states.

Certain exemplary embodiments may provide an apparatus including at least one processor and at least one memory storing instructions. The instructions, when executed by the at least one processor, cause the apparatus at least to configure, for a user equipment, a plurality of numbers of repetitions and at least one duration of at least one timer for at least one of the plurality of numbers of repetitions. The apparatus may be further caused to transmit, to the user equipment, an indication of a number of repetitions of an uplink channel and receive, from the user equipment, the uplink channel with the number of repetitions and start the at least one timer. The apparatus may be caused to determine, based on an expiration status of the at least one timer, a discontinuous reception state of the user equipment comprising a plurality of active and inactive states.

Various exemplary embodiments may provide a method including receiving, from a network entity, an indication of a number of repetitions of an uplink channel and determining at least one duration of at least one timer based on at least the number of repetitions. The method may also include transmitting the uplink channel with the number of repetitions and starting the timer and determining, based on an expiration status of the at least one timer, a discontinuous reception state of the apparatus comprising a plurality of active and inactive states.

Some exemplary embodiments may provide a method including configuring, for a user equipment, a plurality of numbers of repetitions and at least one duration of at least one timer for at least one of the plurality of numbers of repetitions. The method may also include transmitting, to the user equipment, an indication of a number of repetitions of an uplink channel and receiving, from the user equipment, the uplink channel with the number of repetitions and starting the at least one timer. The method may further include determining, based on an expiration status of the at least one timer, a discontinuous reception state of the user equipment comprising a plurality of active and inactive states.

BRIEF DESCRIPTION OF THE DRAWINGS

For proper understanding of example embodiments, reference should be made to the accompanying drawings, as follows:

FIG. 11A illustrates a further example of active and inactive durations for a timer fixed for PUSCH transmission, according to some exemplary embodiments;

FIG. 11B illustrates another further example of active and inactive durations for a timer fixed for PUSCH transmission, according to various exemplary embodiments;

FIG. 11C illustrates an additional further example of active and inactive durations for a timer fixed for PUSCH transmission, according to certain exemplary embodiments;

FIG. 12 illustrates an example of a flow diagram of one or more procedures, according to various exemplary embodiments;

FIG. 13 illustrates another example of a flow diagram of one or more procedures, according to some exemplary embodiments;

FIG. 14 illustrates an example of a flow diagram of a method, according to certain exemplary embodiments;

DETAILED DESCRIPTION

Figures 1A, 1B:
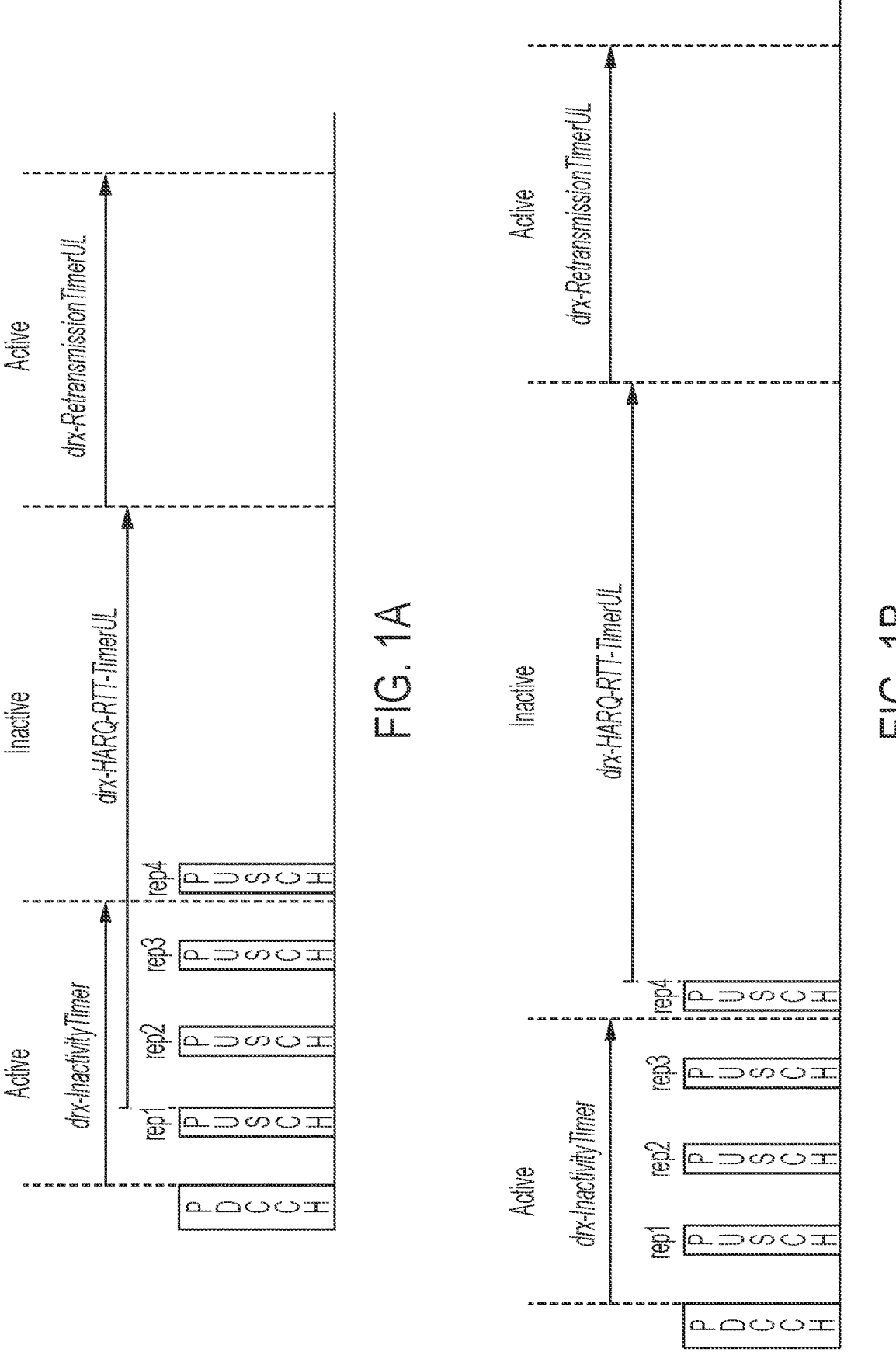
FIG. 1A illustrates an example of a diagram for active and inactive durations for uplink (UL) transmission with repetitions.
FIG. 1B illustrates another example of a diagram for active and inactive durations for UL transmission with repetitions.

It will be readily understood that the components of certain example embodiments, as generally described and illustrated in the figures herein, may be arranged and designed in a wide variety of different configurations. The following is a detailed description of some exemplary embodiments of systems, methods, apparatuses, and non-transitory computer program products for balancing latency reduction and user equipment power saving. Although the devices discussed below and shown in the figures refer to 5G or Next Generation NodeB (gNB) devices and user equipment (UE), this disclosure is not limited to only gNBs and UEs. For example, the following description may also apply to any type of network access node or entity and UE or mobile device.

Additionally, if desired, the different functions or procedures discussed herein may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

In 5G/NR technology, a UE may enter a radio resource control (RRC)_connected state and an RRC_idle state/mode, such as a sleep mode, in order to reduce power consumption with active communications are not needed. In the RRC_idle state, the UE reduces power consumption and improves battery life. A paging signal, such as a wake-up signal (WUS), may be transmitted to the UE, for example, over a physical downlink shared channel (PDSCH) that "wakes up" the UE from the RRC_idle state so that the UE may prepare to receive data. Power consumption may depend on a length of a wake-up period, such as a paging cycle.

To meet battery life requirements, a discontinuous reception (DRX) cycle may be used, resulting in high latency, which may not be suitable for services with requirements of both long battery life and low latency. A UE may need to periodically wake up once per DRX cycle, which may significantly increase power consumption in periods with no signaling or data traffic. If the UE may instead wake up when triggered, e.g., paging, then power consumption may be reduced.

DRX may define active or inactive modes for UE. The active mode may also referred to as DRX ON, a DRX ON period, a DRX ON state, an ON period, an ON state, an active period, and/or an active state. The DRX ON may be defined as the UE may monitor the downlink control channel (PDCCH) and may transmit signals in the uplink and receive signals in the downlink. The state is also known as an active mode, a DRX ON period, a DRX ON state, an ON period, an ON state, an active period, an active state. The inactive mode may also referred to as a DRX OFF, a DRX sleep state, a DRX OFF period, DRX OFF state, an OFF period, an OFF state, a power saving mode, a power saving state, a sleep state, and/or a sleep mode. The DRX OFF may be defined as the UE may not monitor the PDCCH and may not transmit uplink signals, except a PUSCH repetition and a scheduling request (SR), and may not receive downlink signals. The UE may avoid monitoring all PDCCH occasions when the UE is in inactive mode. The UE may be permitted to transmit using an uplink during inactive mode. For example, the UE may transmit a repetition on a physical uplink shared channel (PUSCH) or may send a scheduling request to initiate an uplink (UL) transmission. The UE may determine whether the UE is in active or inactive modes due to a set of timers and conditions. For example, the timers may be one of the following: drx-InactivityTimer may be defined based on the duration after the PDCCH occasion/reception in which a PDCCH indicates a new UL, DL or SL transmission for the MAC entity; drx-HARQ-RTT-TimerUL may be defined per UL hybrid automatic repeat request (HARQ) process as the minimum duration before a UL HARQ retransmission grant is expected by a medium access control (MAC) entity; drx-RetransmissionTimerUL may be defined per UL HARQ process as the maximum duration until a grant for UL retransmission is received; drx-HARQ-RTT-TimerDL may be defined per DL HARQ process, except for a broadcast process, as the minimum duration before a DL assignment for HARQ retransmission is expected by the MAC entity; and drx-RetransmissionTimerDL may be defined per DL HARQ process, except for the broadcast process, as the maximum duration until a DL retransmission is received.

An example of a condition for using the timers for UL transmissions may be if drx-LastTransmissionUL is configured, the drx-HARQ-RTT-TimerUL for the corresponding HARQ process may be started from a first symbol after the end of a last transmission within a bundle of the corresponding PUSCH transmission. Another example of a condition for using the timers for UL transmissions may be if drx-LastTransmissionUL is not configured, the drx-HARQ-RTT-TimerUL for the corresponding HARQ process may be started from the first symbol after the end of the first transmission within a bundle of the corresponding PUSCH transmission. A further example of a condition for using the timers for UL transmissions may be if a drx-HARQ-RTT-TimerUL expires, the drx-RetransmissionTimerUL for the corresponding HARQ process may be started from the first symbol after the expiry of drx-HARQ-RTT-TimerUL.

An example of a condition for using the timers for DL transmissions may be if HARQ feedback is enabled, the drx-HARQ-RTT-TimerDL for the corresponding HARQ process(es), whose HARQ feedback is reported, may be started or restarted from the first symbol after the end of the corresponding transmission carrying the DL HARQ feedback. Another example of a condition for using the timers for DL transmissions may be if a drx-HARQ-RTT-TimerDL expires and if the data of the corresponding HARQ process was not successfully decoded, the drx-RetransmissionTimerDL may be started for the corresponding HARQ process in the first symbol after the expiry of drx-HARQ-RTT-TimerDL.

The UE may determine a duration for short DRX cycles, which is defined by drx-ShortCycle×drx-ShortCycleTimer, and may start after drx-InactivityTimer expires. During this duration, the UE may enter an active mode for a duration of drx-onDurationTimer after drx-SlotOffset duration after the following condition is satisfied: [(SFN×10)+subframe number] modulo (drx-ShortCycle)=(drx-StartOffset) modulo (drx-ShortCycle).

The UE may start duration for long DRX cycles after the short DRX cycles duration expires. During this duration, the UE may enter active mode for a duration of drx-onDurationTimer after drx-SlotOffset duration after the following condition is satisfied: [(SFN×10)+subframe number] modulo (drx-LongCycle)=drx-StartOffset.

FIG. 1A illustrates an example of a diagram for active and inactive durations for UL transmission with repetitions when drx-LastTransmissionUL is not configured. When drx-LastTransmissionUL is not configured (disabled), a drx-HARQ-RTT-TimerUL may start after the first repetition.

FIG. 1B illustrates an example of a diagram for active and inactive durations for UL transmission with repetitions when drx-LastTransmissionUL is configured. When drx-LastTransmissionUL is configured (enabled), the drx-HARQ-RTT-TimerUL may start after the last repetition.

Figures 2, 3:
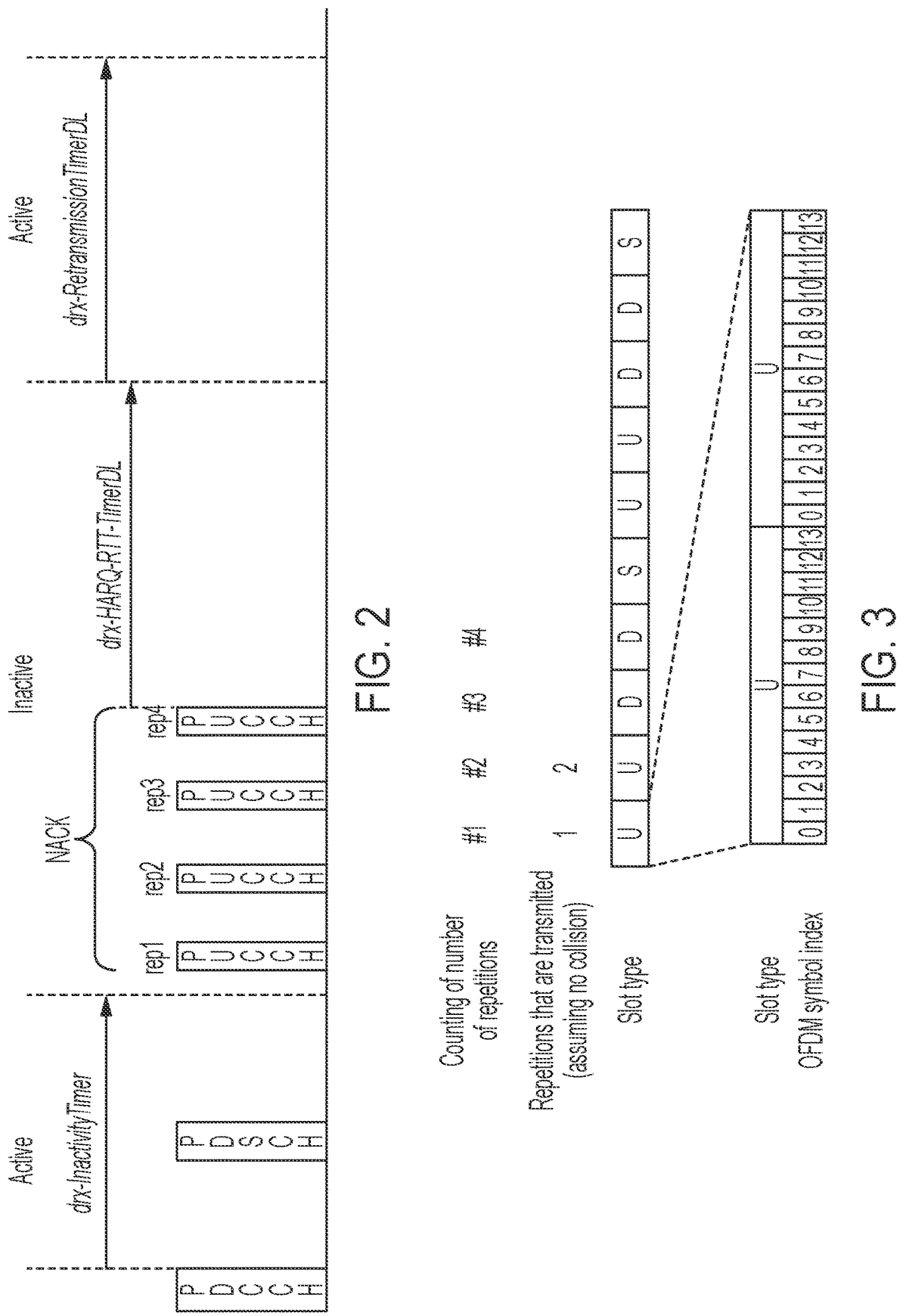
FIG. 2 illustrates an example of a diagram for active and inactive durations for downlink (DL) transmission.
FIG. 3 an example of a diagram of physical uplink shared channel (PUSCH) repetition type A with four repetitions.

FIG. 2 illustrates an example of a diagram for active and inactive durations for DL transmission when the PUCCH carries a non-acknowledgement (NACK) of the DL transmission is transmitted with PUCCH repetition. The corresponding timers may be used for determining active and inactive durations when DL transmission. The PUCCH may carry the NACK of the DL transmission, which may be transmitted with PUCCH repetitions. The timer drx-HARQ-RTT-TimerDL may start from the first symbol after the end of the corresponding transmission carrying the DL HARQ feedback. The timer of drx-HARQ-RTT-TimerDL may start from the last repetition. For example, an entire bundle of PUCCH repetitions may be considered as a corresponding transmission, or the timer drx-HARQ-RTT-TimerDL may restart from the first symbol after the end of each and every corresponding transmission carrying the DL HARQ feedback.

FIG. 3 illustrates an example of a diagram of PUSCH repetition type A with four repetitions. PUSCH repetition type A, which may be a slot aggregation for the PUSCH, may be performed by transmission of a transport block repeatedly in multiple slots. Each repetition may be in a slot. A single starting and length of a PUSCH within a slot may be indicated, which may be referred to as a single start and length indicator value (SLIV). The same start and length indicated by the single SLIV may be applied across all PUSCH repetitions. The number of repetitions for PUSCH repetitions type A may be semi-statically configured in RRC and the number of repetitions may be counted on consecutive physical slots. If the number of available symbols in a slot is not sufficient (<L), PUSCH repetition(s) may not be transmitted in the slot. The PUSCH repetitions may have the same frequency domain resource allocation, such as, for example, the same number of physical resource blocks (PRBs) and the same location of these PRBs in frequency domain.

A transport block size (TBS) may be determined. The unquantized intermediate variable ($N_{Info}$) for the calculation of TBS for PUSCH repetition type A may be calculated based on the number of REs determined in a slot. Rate-matching may be defined as the same or different redundancy version (RV) of the encoded bits in circular buffer which may be applied for each PUSCH repetition.

Figure 4:
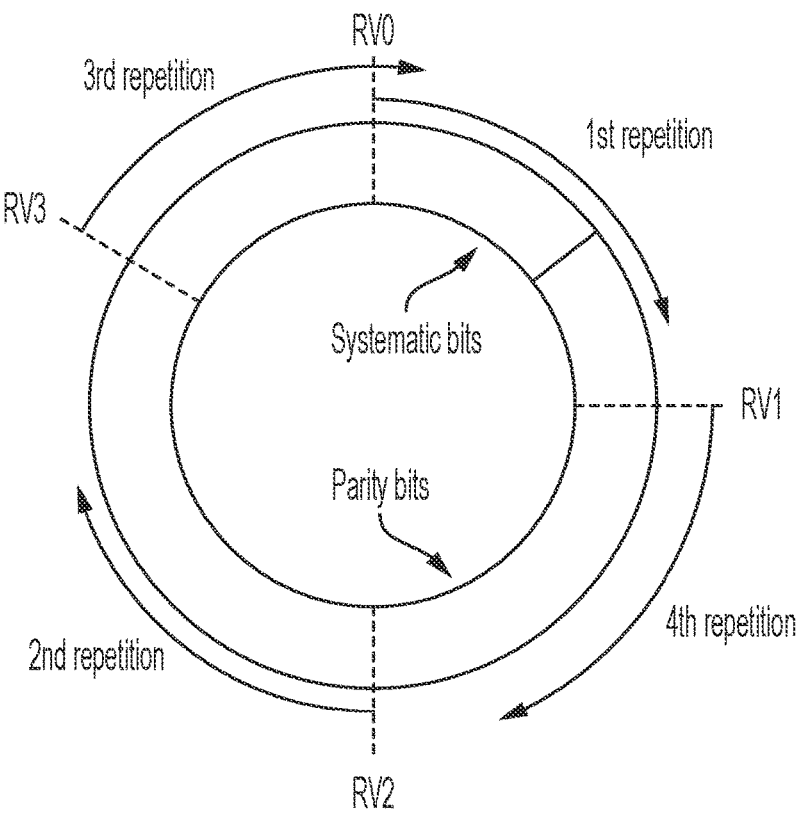
FIG. 4 an example of a diagram for bit selection for PUSCH repetition type A with redundancy version (RV) cycling.

FIG. 4 illustrates an example of a diagram for bit selection for PUSCH repetition type A with RV cycling. The RV for the first repetition may be indicated by scheduling DCI for dynamic grant or preconfigured for configured grant. If different RVs are applied, RVs may be cycled from a configured RV sequence following the indicated RV for the first repetition. For example, there may be four RVs and each may provide information on the starting encoded bit from circular buffer that UE may map to a PUSCH transmission associated with the RV.

The number of repetitions for PUSCH repetition type A may be dynamically indicated by associating the number of repetitions to each row of time domain resource assignment (TDRA) table. A PUSCH repetition type B for ultra-reliable low latency (URLLC) applications may use a single SLIV for determining multiple back-to-back nominal repetitions with the same length and each nominal repetition may span across the slot boundary. Each nominal repetition may be split into multiple actual repetitions if the nominal repetition crosses the slot boundary or invalid symbols. The PUSCH repetitions in PUSCH repetition type B may have the same frequency domain resource allocation.

Figure 5:
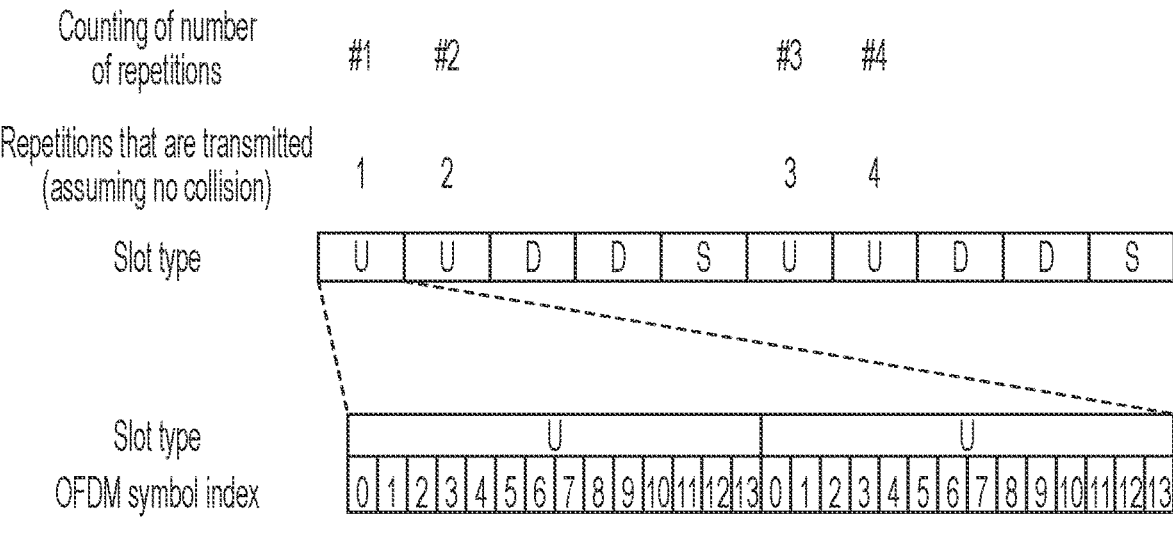
FIG. 5 illustrates another example of a diagram for PUSCH repetition type A.

FIG. 5 illustrates an example of a diagram for PUSCH repetition type A. The PUSCH repetition type A may have a number of repetitions that may be counted on available slots, such as only on the slots that are available for the transmissions of the repetitions. The number of PUCCH repetitions may be fixed by nrofSlots configured in PUCCH-Format-Config. The number of PUCCH repetitions may be counted on available slots. The network (NW) may dynamically indicate the number of PUCCH repetitions by selecting a PUCCH resource from a PUCCH resource set using PUCCH resource indicator (PRI) in the DCI. The network (NW) may refer to a base station, such as a gNB, or any other network entity configured to facilitate an RRC connection with a UE.

UEs with increased repetitions may be more delay constrained by suffering from a longer transmission time per HARQ attempt/bundle. UEs in worse radio frequency (RF) conditions may be more likely to use repetitions, such as, for example, a voice over new radio (VoNR) UE at the cell edge may be more likely to use repetitions on the uplink. A network scheduler may provide retransmission grants with repetitions of higher priority to compensate for the delay. As a result, the network processing and/or scheduling time after the after the end of each transmission with repetitions prior to the retransmission with repetitions may be reduced by the higher priority for retransmissions with repetitions.

When drx-LastTransmissionUL is not configured or disabled, the drx-HARQ-RTT-TimerUL starts after the first repetition. Since drx-RetransmissionTimerUL, which starts after drx-HARQ-RTT-TimerUL expires, may be used for the UE to return to active mode for monitoring PDCCH that schedules retransmission of the PUSCH. The network may configure drx-HARQ-RTT-TimerUL to cover all of the PUSCH repetitions duration, such as, for example, until the last PUSCH repetition plus the network processing and/or scheduling time. Given that the number of PUSCH repetitions may be dynamically indicated while drx-HARQ-RTT-TimerUL is semi-statically configured in RRC, the network may configure drx-HARQ-RTT-TimerUL, such that this timer could cover the maximum repetition duration, such as the repetition duration considering the maximum number of repetitions). This may increase the latency when counting on available slots and the number of repetitions is smaller.

Figure 6A:
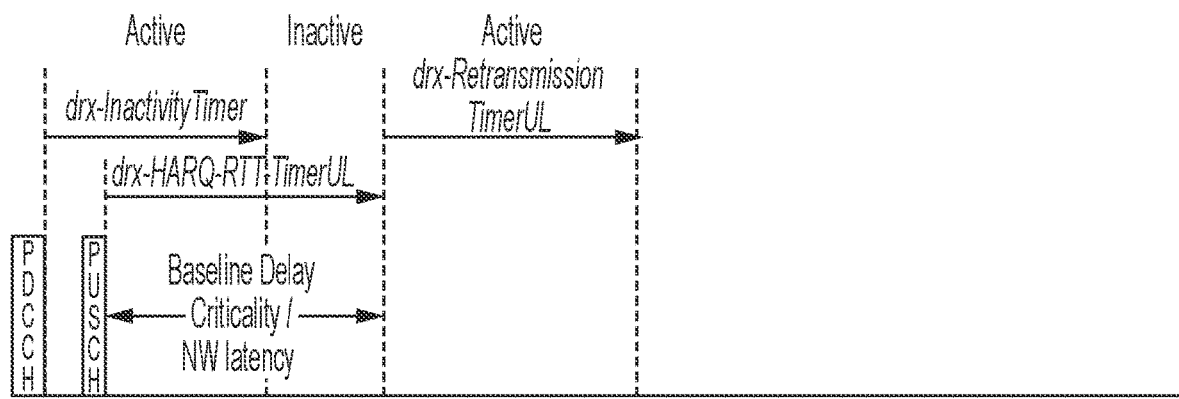
FIG. 6A illustrates an example of a diagram for active and inactive durations determination.

When drx-LastTransmissionUL is configured or enabled, drx-HARQ-RTT-TimerUL may start after the last repetition. Although applying drx-LastTransmissionUL may partly solve the issue of significant latency increase, there may be drawbacks. For example, FIG. 6A illustrates an example of a diagram for active and inactive durations determination when drx-LastTransmissionUL is configured and drx-HARQ-RTT-TimerUL is fixed for PUSCH transmission with one repetition. When the drx-HARQ-RTT-TimerUL is fixed, the inactive duration may be short for a smaller number of repetitions and latency may not be as critical and/or the network processing and/or scheduling latency may not be as low at the time when drx-HARQ-RTT-TimerUL starts. The UE may have longer inactive duration for power saving, such as by considering longer drx-HARQ-RTT-TimerUL.

Figure 6B:
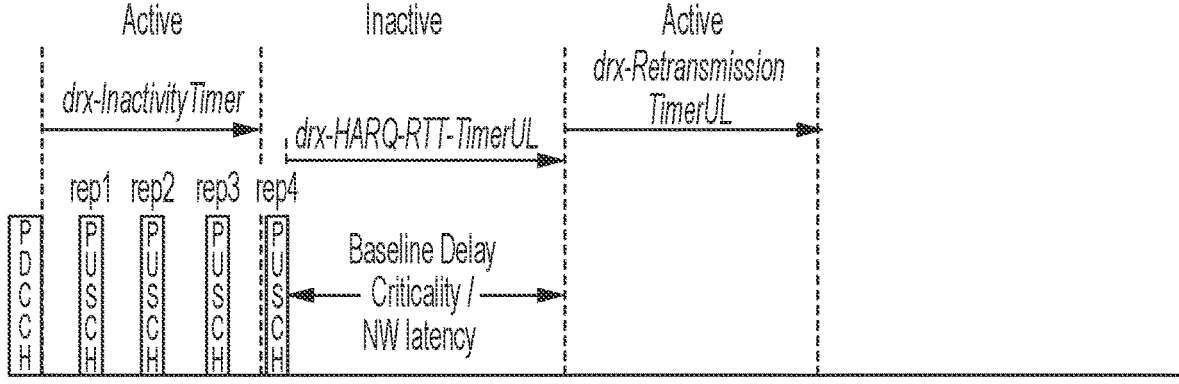
FIG. 6B illustrates another example of a diagram for active and inactive durations determination.
Figure 6C:
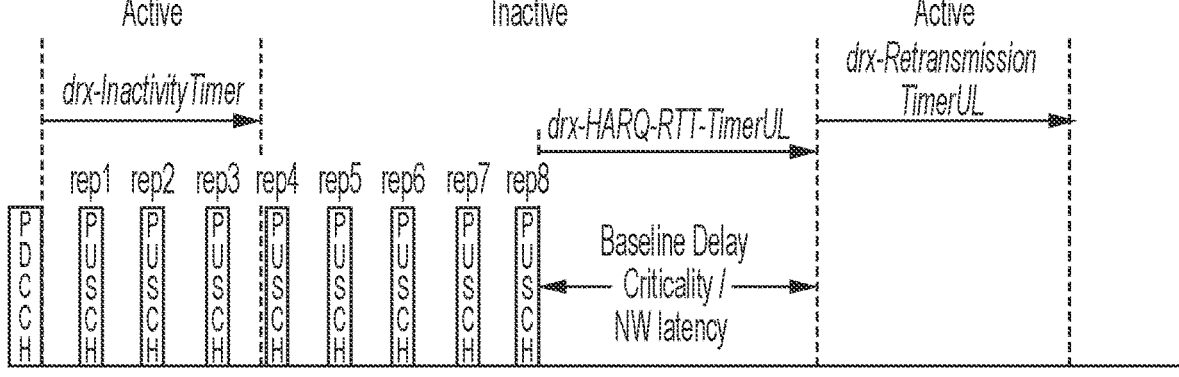
FIG. 6C illustrates a further example of a diagram for active and inactive durations determination.

As another example, FIG. 6B illustrates an example of a diagram for active and inactive durations determination when drx-LastTransmissionUL is configured and drx-HARQ-RTT-TimerUL is fixed for PUSCH transmission with four repetitions. As a further example, FIG. 6C illustrates an example of a diagram for active and inactive durations determination when drx-LastTransmissionUL is configured and drx-HARQ-RTT-TimerUL is fixed for PUSCH transmission with eight repetitions. When the number of repetitions may be higher, such as the repetition duration is longer when counting on available slots is considered), latency may be important and/or network processing and/or scheduling latency may be reduced at the time when drx-HARQ-RTT-TimerUL starts. The UE may return to active mode faster to avoid significant latency increase in case retransmission may be needed, such as by considering shorter drx-HARQ-RTT-TimerUL.

PUCCH repetition in DRX may have a similar problems as for PUSCH repetitions in DRX when drx-LastTransmissionUL is configured. The inactive duration may be short for a small number of PUCCH repetitions and long for high number of repetitions. The length of the PDCCH monitoring duration of retransmission scheduling may be increased when using repetitions, such as increasing the length of the drx-RetransmissionTimerUL. The use of repetitions may increase the maximum scheduling delay before retransmission starts. The retransmission grant may need to wait longer so as to not overlap with the end, or "tail," of an already scheduled or already underway bundle for the UE, so that different repetition bundles for the same UE do not overlap, or to avoid a configured grant (CG). The retransmission grant may need to wait longer to be scheduled so bundle start times are more aligned, to better pack grants with repetitions and avoid frequency slash time resource fragmentation. The retransmission grant delay may exist to avoid out of order scheduling for a maximum value of K2. Although the priority for repetition bundles may be higher, the maximum scheduling delay encountered by repetitions may still be larger.

When allowing repetitions there may be a greater need for a longer retransmission window to increase link reliability given that, for users at a cell edge, repetitions are more likely used. A longer retransmission window may allow multiple transmissions attempts or repetitions of PDCCH and may allow for the tolerating greater retransmission scheduling delays.

Various exemplary embodiments may provide advantages to resolve the deficiencies in the technology, such as the deficiencies discussed above. For example, certain exemplary embodiments may advantageously provide one or more procedures for enabling a UE to determine drx-HARQ-RTT-TimerUL/drx-HARQ-RTT-TimerDL based on the number of PUSCH/PUCCH repetitions. The timers may advantageously define a minimum duration before a DL assignment or a UL grant for HARQ retransmission is expected by a MAC entity of the UE.

According to various exemplary embodiments, a UE may receive from a base station, such as a gNB, an indication about a number of repetitions of PUCCH or PUSCH. Based on the indicated number of repetitions, the UE may determine a duration of a timer (drx-HARQ-RTT-TimerDL or drx-HARQ-RTT-TimerUL), where the duration of the timer may be a minimum duration before a downlink control channel (a DL assignment or an UL grant) for HARQ retransmission may be expected by a MAC entity of the UE. The UE may transmit the uplink channel with repetitions. In response to transmitting a repetition (first or last repetition) of the uplink channel, the UE may start the timer. The UE may determine a DRX state (DRX ON or DRX OFF) based at least on the expiration status of the timer, such as the timer running or timer expired.

Figure 7A:
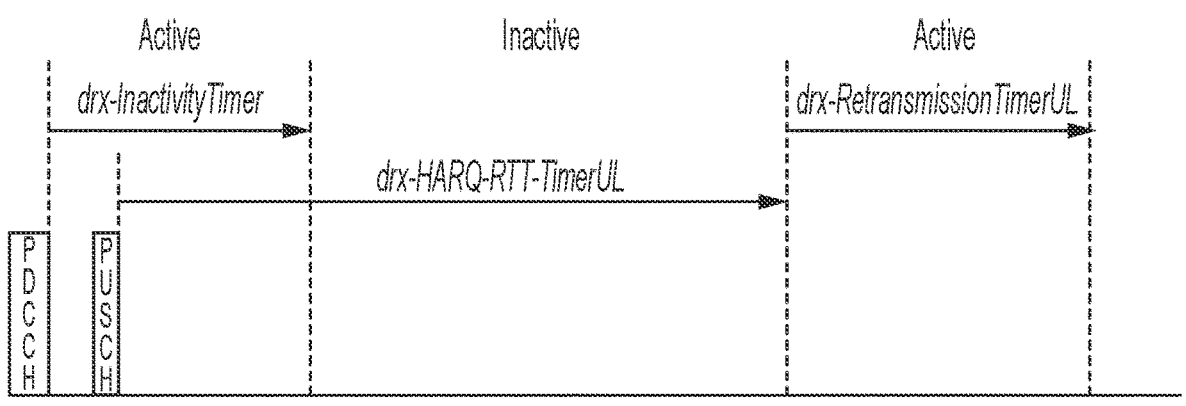
FIG. 7A illustrates an additional example of a diagram for active and inactive durations, according to various exemplary embodiments.
Figure 7B:
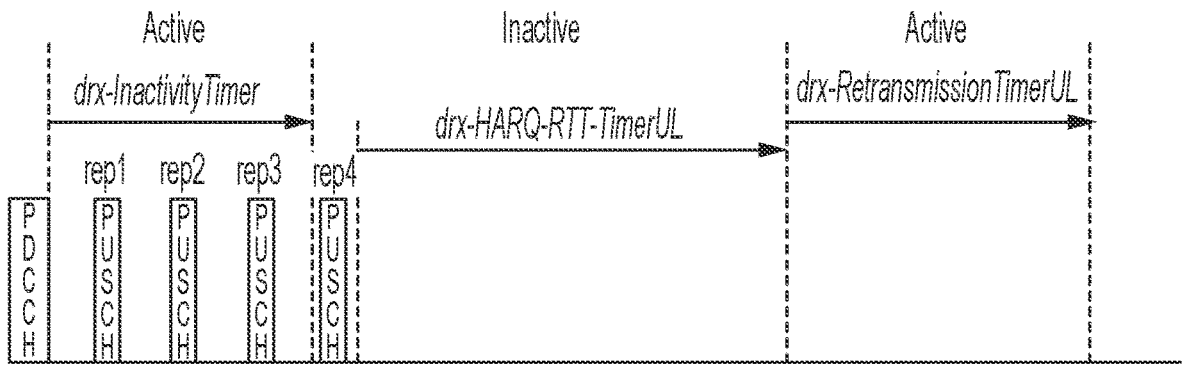
FIG. 7B illustrates another additional example of a diagram for active and inactive durations, according to some exemplary embodiments.
Figure 7C:
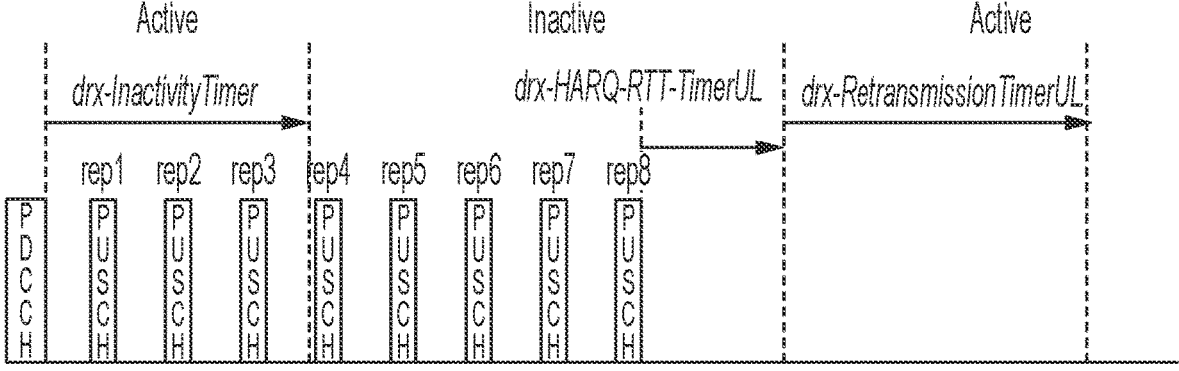
FIG. 7C illustrates a further additional example of a diagram for active and inactive durations, according to certain exemplary embodiments.

FIG. 7A illustrates an example of active and inactive durations when drx-LastTransmissionUL is configured and drx-HARQ-RTT-TimerUL is adapted with one repetition for PUSCH transmission, according to various exemplary embodiments. In this case, given the small number of repetitions, latency may not be prioritized at the time when drx-HARQ-RTT-TimerUL starts and the drx-HARQ-RTT-TimerUL may be adjusted to be longer for the UE to have sufficient inactive duration to result in energy savings. FIG. 7B illustrates an example of active and inactive durations when drx-LastTransmissionUL is configured and drx-HARQ-RTT-TimerUL is adapted with four repetitions for PUSCH transmission, according to various exemplary embodiments. In this case, given the moderate number of repetitions, the latency constraint may be considered a moderate priority at the time when drx-HARQ-RTT-TimerUL starts and the drx-HARQ-RTT-TimerUL may be adjusted to be a moderate value for the UE to have sufficient inactive duration while also meeting the latency constraint to result in energy savings and an acceptable latency. FIG. 7C illustrates an example of active and inactive durations when drx-LastTransmissionUL is configured and drx-HARQ-RTT-TimerUL is adapted with eight repetitions for PUSCH transmission, according to various exemplary embodiments. In this case, given the high number of repetitions, latency may be considered a higher priority at the time when drx-HARQ-RTT-TimerUL starts, especially when counting on the available slots is used. The drx-HARQ-RTT-TimerUL may be adjusted to be smaller for UE meet latency constraint. As illustrated in FIGS. 7A-7C, various exemplary embodiments may provide one or more procedures for adapting the minimum duration before a UL HARQ retransmission grant is expected with the number of PUSCH (or PUCCH repetitions).

Figure 8A:
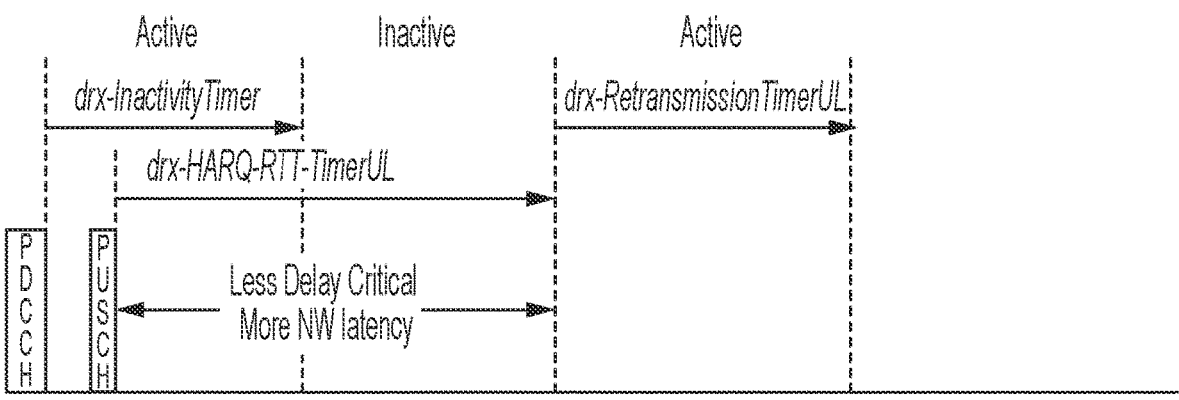
FIG. 8A illustrates an example of active and inactive durations for a timer adapted for PUSCH transmission, according to various exemplary embodiments.
Figure 8B:
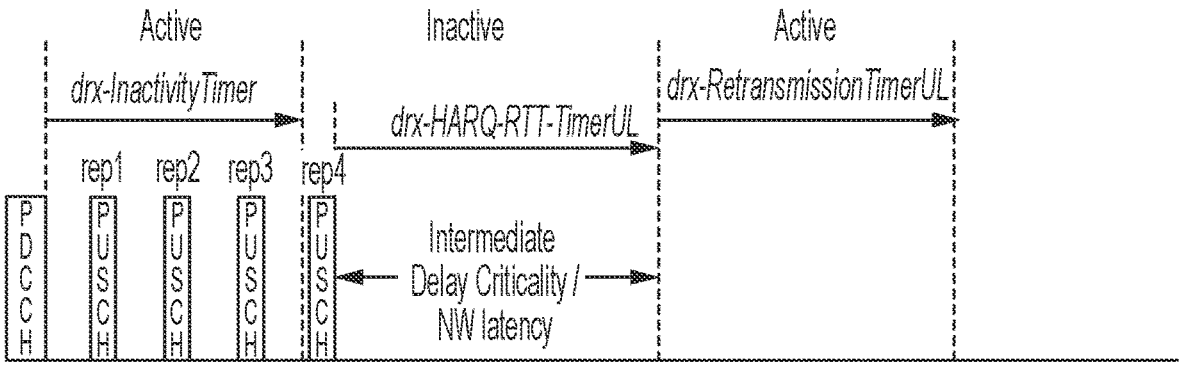
FIG. 8B illustrates another example of active and inactive durations for a timer adapted for PUSCH transmission, according to certain exemplary embodiments.
Figure 8C:
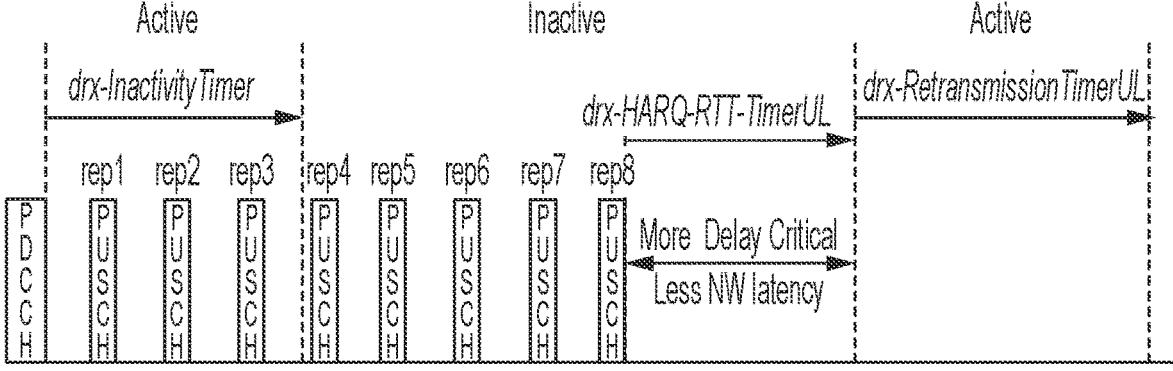
FIG. 8C illustrates a further example of active and inactive durations for a timer adapted for PUSCH transmission, according to various exemplary embodiments.

FIGS. 8A-8C illustrate additional examples of active and inactive durations determination when drx-LastTransmissionUL is configured and drx-HARQ-RTT-TimerUL is adapted with number of repetitions. FIG. 8A illustrates an example of active and inactive durations when drx-LastTransmissionUL is configured and drx-HARQ-RTT-TimerUL is adapted with one repetition for PUSCH transmission, according to various exemplary embodiments. In this case, given the small number of repetitions, latency may not be prioritized at the time when drx-HARQ-RTT-TimerUL starts and the drx-HARQ-RTT-TimerUL may be adjusted to be longer for the UE to have sufficient inactive duration to result in energy savings. FIG. 8B illustrates an example of active and inactive durations when drx-LastTransmissionUL is configured and drx-HARQ-RTT-TimerUL is adapted with four repetitions for PUSCH transmission, according to various exemplary embodiments. In this case, given the moderate number of repetitions, the latency constraint may be considered a moderate priority at the time when drx-HARQ-RTT-TimerUL starts and the drx-HARQ-RTT-TimerUL may be adjusted to be a moderate value for the UE to have sufficient inactive duration while also meeting the latency constraint to result in energy savings and an acceptable latency. FIG. 8C illustrates an example of active and inactive durations when drx-LastTransmissionUL is configured and drx-HARQ-RTT-TimerUL is adapted with eight repetitions for PUSCH transmission, according to various exemplary embodiments. In this case, given the high number of repetitions, latency may be considered a higher priority at the time when drx-HARQ-RTT-TimerUL starts, especially when counting on the available slots is used. The drx-HARQ-RTT-TimerUL may be adjusted to be smaller for UE meet latency constraint.

Certain exemplary embodiments may provide that a network, such as a base station or gNB, may configure one or a plurality of values for a minimum duration before a UL HARQ retransmission grant is expected by the MAC entity, such as drx-HARQ-RTT-TimerUL. Each value may be associated with at least one number of PUSCH repetitions. An alternative may be that the gNB may configure one or a plurality of values for the minimum duration for PUSCH repetitions using, for example, a flag or a bit map in which each bit may be per each number of PUSCH repetitions. A drx-HARQ-RTT-TimerUL may be specified for each number of PUSCH repetitions. Another alternative may be that the gNB may configure an offset value per number of PUSCH repetitions. The offset may be subtracted or added to the RRC configured drx-HARQ-RTT-TimerUL. If an offset is not configured, then the RRC configured drx-HARQ-RTT-TimerUL may be applied.

The network, such as the gNB, may configure one or a plurality of values for the minimum duration before a DL assignment for HARQ retransmission is expected by the MAC entity, such as drx-HARQ-RTT-TimerDL. Each value may be associated with at least one number of PUCCH repetitions. An alternative may be that the gNB may configure one or a plurality of values for the minimum duration for PUSCH repetitions using, for example, a flag or a bit map in which each bit may be per each number of PUCCH repetitions. A drx-HARQ-RTT-TimerDL may be specified for each number of PUCCH repetitions. Another alternative may be that the gNB may configure an offset value per number of PUCCH repetitions, where the offset may be subtracted or added to the RRC configured drx-HARQ-RTT-TimerDL. If an offset is not configured, the RRC configured drx-HARQ-RTT-TimerDL may be applied.

The UE may determine a value to be applied for drx-HARQ-RTT-TimerUL or drx-HARQ-RTT-TimerDL based on a number of PUSCH repetitions or a number of PUCCH repetitions.

Figure 9A:
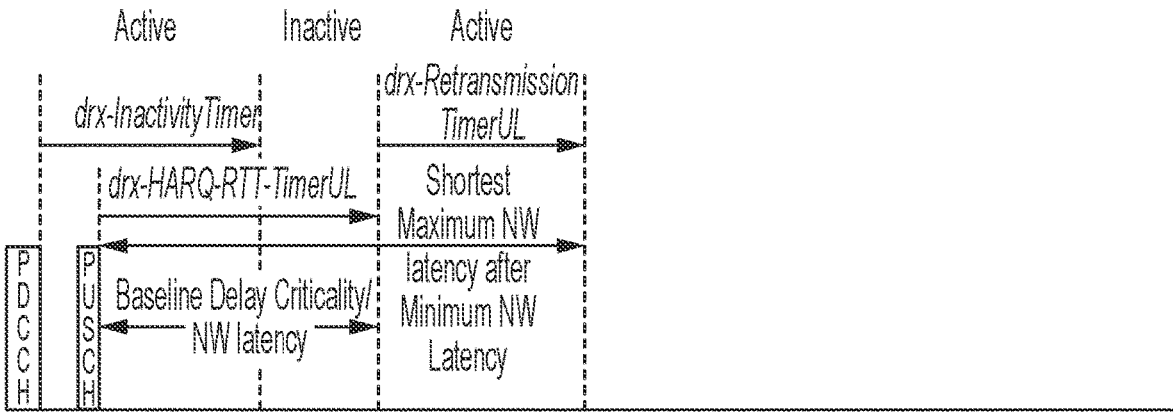
FIG. 9A illustrates an example of active and inactive durations for a timer fixed for PUSCH transmission, according to some exemplary embodiments.
Figure 9B:
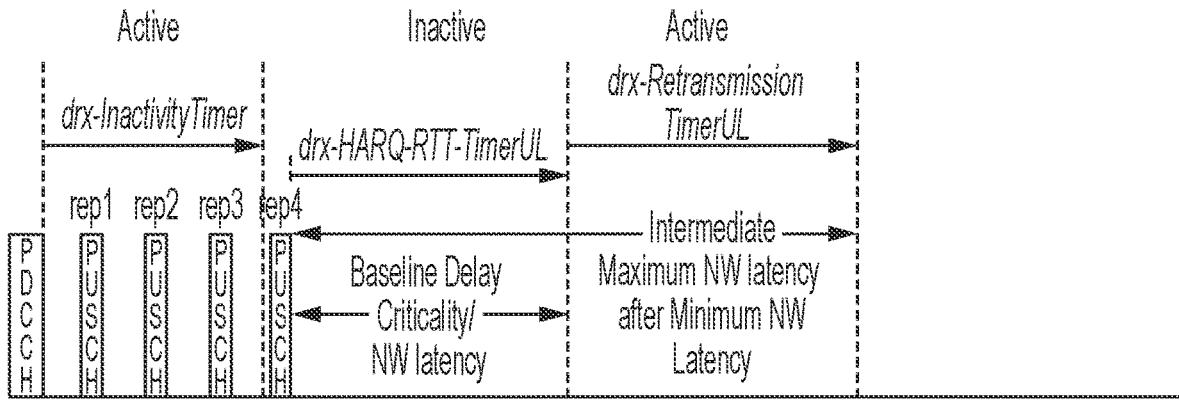
FIG. 9B illustrates another example of active and inactive durations for a timer fixed for PUSCH transmission, according to certain exemplary embodiments.
Figure 9C:
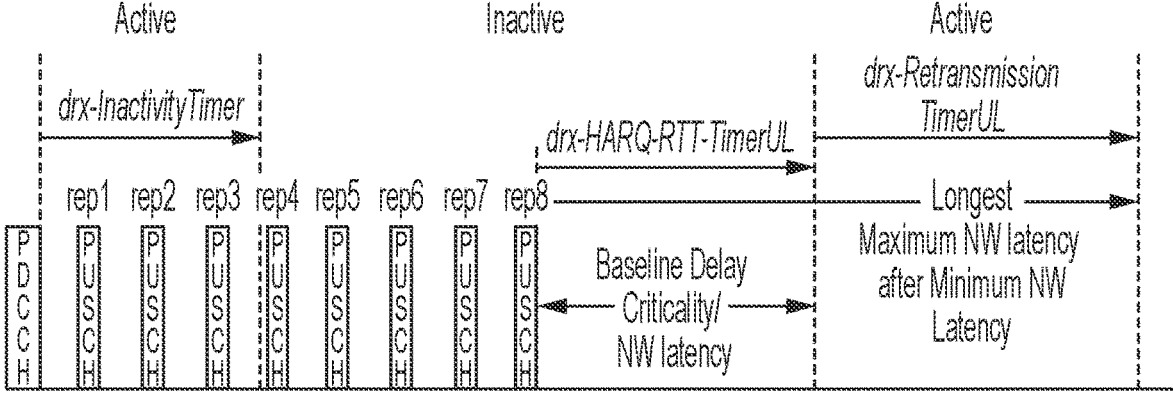
FIG. 9C illustrates a further example of active and inactive durations for a timer fixed for PUSCH transmission, according to various exemplary embodiments.

FIG. 9A illustrates an example of active and inactive durations when drx-LastTransmissionUL is configured and drx-HARQ-RTT-TimerUL is fixed for PUSCH transmission with one repetition, according to certain exemplary embodiments. In this case, since the number of repetitions may be small, the scheduling delay may not be prioritized, such as no or only a relatively low number of scheduling grants are blocked during inactive duration. Therefore, the drx-RetransmissionTimerUL may be adjusted to be smaller. FIG. 9B illustrates an example of active and inactive durations when drx-LastTransmissionUL is configured and drx-HARQ-RTT-TimerUL is fixed for PUSCH transmission with four repetitions, according to various exemplary embodiments. In this case, since the number of repetitions may be considered moderate, the scheduling delay constraint may be of moderate priority, such as a moderate number of scheduling grants may be blocked during inactive duration. Therefore, the drx-Retransmission TimerUL may be adjusted to be a relatively moderate value. FIG. 9C illustrates an example of active and inactive durations when drx-LastTransmissionUL is configured and drx-HARQ-RTT-TimerUL is fixed for PUSCH transmission with eight repetitions, according to various exemplary embodiments. In this case, since the number of repetitions may be relatively high, the scheduling delay constraint may be prioritized, such as a relatively high number of scheduling grants may be blocked during inactive duration. Therefore, the drx-RetransmissionTimerUL may be adjusted to be a relatively larger value for releasing all the blocked scheduling grants.

Figure 10A:
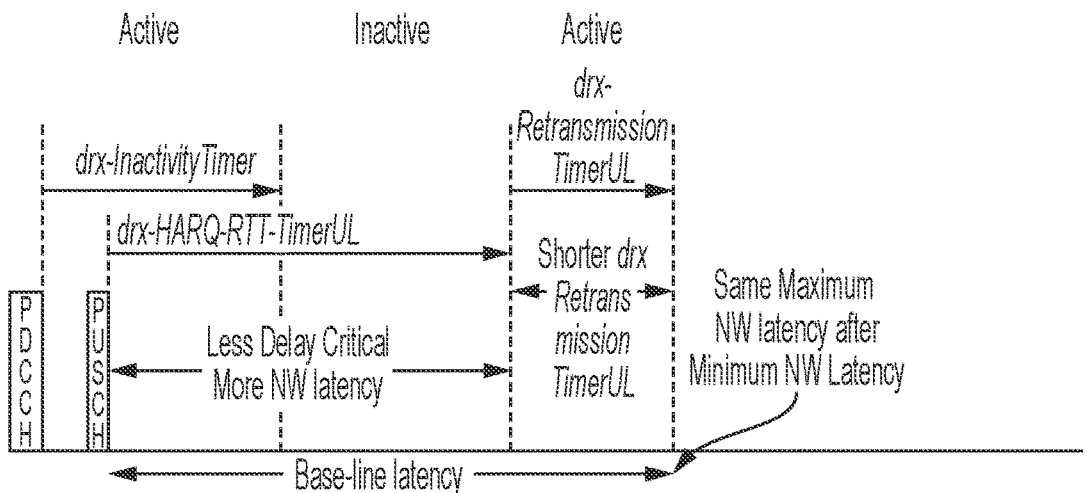
FIG. 10A illustrates an additional example of active and inactive durations for a timer fixed for PUSCH transmission, according to some exemplary embodiments.
Figure 10B:
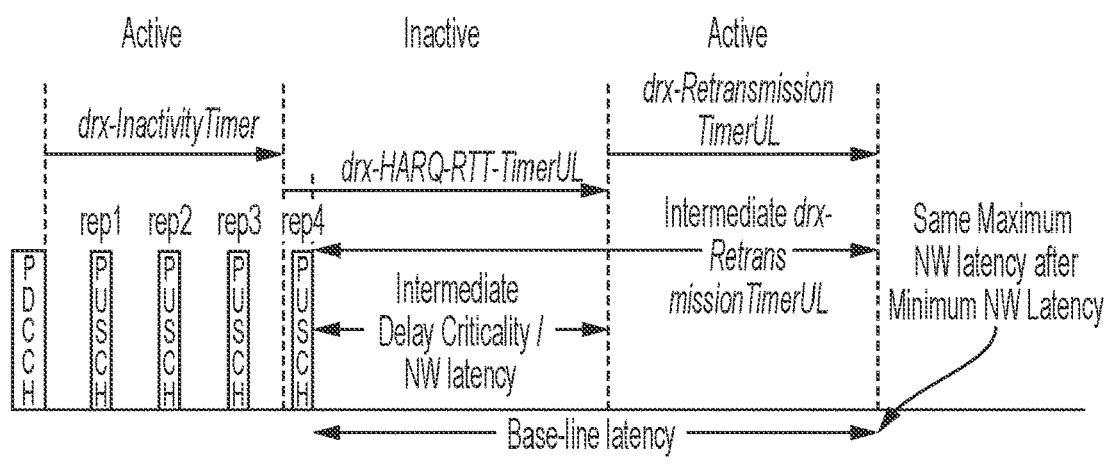
FIG. 10B illustrates another additional example of active and inactive durations for a timer fixed for PUSCH transmission, according to various exemplary embodiments.
Figure 10C:
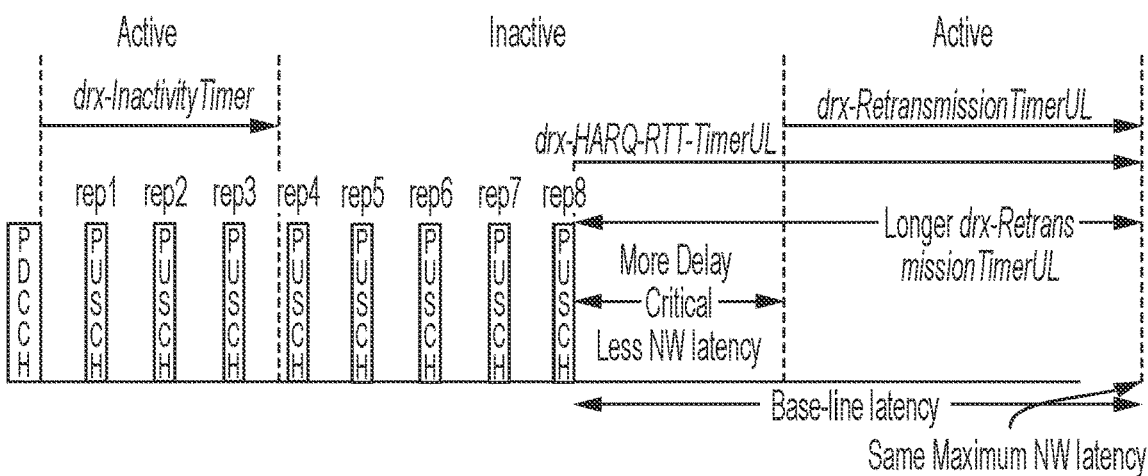
FIG. 10C illustrates a further additional example of active and inactive durations for a timer fixed for PUSCH transmission, according to various exemplary embodiments.

FIG. 10A illustrates another example of active and inactive durations when drx-LastTransmissionUL is configured and drx-HARQ-RTT-TimerUL is fixed for PUSCH transmission with one repetition, according to some exemplary embodiments. In this case, since the number of repetitions may be small, the scheduling delay may not be prioritized, such as no or only a relatively low number of scheduling grants are blocked during inactive duration. Therefore, the drx-RetransmissionTimerUL may be adjusted to be smaller. FIG. 10B illustrates another example of active and inactive durations when drx-LastTransmissionUL is configured and drx-HARQ-RTT-TimerUL is fixed for PUSCH transmission with four repetitions, according to certain exemplary embodiments. In this case, since the number of repetitions may be considered moderate, the scheduling delay constraint may be of moderate priority, such as a moderate number of scheduling grants may be blocked during inactive duration. Therefore, the drx-RetransmissionTimerUL may be adjusted to be a relatively moderate value. FIG. 10C illustrates another example of active and inactive durations when drx-LastTransmissionUL is configured and drx-HARQ-RTT-TimerUL is fixed for PUSCH transmission with eight repetitions, according to various exemplary embodiments. In this case, since the number of repetitions may be relatively high, the scheduling delay constraint may be prioritized, such as a relatively high number of scheduling grants may be blocked during inactive duration. Therefore, the drx-RetransmissionTimerUL may be adjusted to be a relatively larger value for releasing all the blocked scheduling grants.

FIG. 11A illustrates another example of active and inactive durations when drx-LastTransmissionUL is configured and drx-HARQ-RTT-TimerUL is adapted for PUSCH transmission with one repetition, according to various exemplary embodiments. In this case, since the number of repetitions may be small, the scheduling delay may not be prioritized, such as no or only a relatively low number of scheduling grants are blocked during inactive duration. Therefore, the drx-RetransmissionTimerUL may be adjusted to be smaller. FIG. 11B illustrates another example of active and inactive durations when drx-LastTransmissionUL is configured and drx-HARQ-RTT-TimerUL is adapted for PUSCH transmission with four repetitions, according to some exemplary embodiments. In this case, since the number of repetitions may be considered moderate, the scheduling delay constraint may be of moderate priority, such as a moderate number of scheduling grants may be blocked during inactive duration. Therefore, the drx-RetransmissionTimerUL may be adjusted to be a relatively moderate value. FIG. 11C illustrates another example of active and inactive durations when drx-LastTransmissionUL is configured and drx-HARQ-RTT-TimerUL is adapted for PUSCH transmission with eight repetitions, according to certain exemplary embodiments. In this case, since the number of repetitions may be relatively high, the scheduling delay constraint may be prioritized, such as a relatively high number of scheduling grants may be blocked during inactive duration. Therefore, the drx-RetransmissionTimerUL may be adjusted to be a relatively larger value for releasing all the blocked scheduling grants.

Various exemplary embodiments may provide one or more procedures for adapting the duration of the monitoring of the PDCCH for scheduling UL HARQ retransmission grant and/or for DL assignment for DL HARQ retransmission based on the number of PUSCH or PUCCH repetitions, as shown illustrated in FIGS. 9A-11C. The network may configure one or a plurality of values for the monitoring duration of the UL HARQ retransmission grant expected by the MAC entity, such as drx-RetransmissionTimerUL. Each value may be associated with at least one number of PUSCH repetitions. The network may configure one or a plurality of values for the monitoring duration of DL assignment for HARQ retransmission expected by the MAC entity, such as drx-RetransmissionTimerDL. Each value may be associated with at least one number of PUCCH repetitions. The UE may determine a value to be applied for drx-RetransmissionTimerUL or drx-RetransmissionTimerDL based on number of PUSCH repetitions or number of PUCCH repetitions.

FIG. 12 illustrates a flow diagram of one or more procedures, according to various exemplary embodiments. The method may include, at 1210, a network, such as a base station or gNB, configuring, as a first example, one or a plurality of values for a minimum duration before a UL HARQ retransmission grant is expected by the MAC entity, such as drx-HARQ-RTT-TimerUL). Each value may be associated with at least one number of PUSCH repetitions.

In addition, or alternatively, the gNB may configure one or a plurality of values for the minimum duration before a DL assignment for HARQ retransmission is expected by the MAC entity, such as drx-HARQ-RTT-TimerDL). Each value may be associated with at least one number of PUCCH repetitions.

As a second example of 1210, some exemplary embodiments may provide that the network, such as a base station or gNB, may configure a scaling factor to be used in conjunction with the configured number of PUSCH repetitions to obtain a value of the minimum duration before a UL HARQ retransmission grant is expected by the MAC entity, such as drx-HARQ-RTT-TimerUL. The value may be associated with the configured number of PUSCH repetitions. In addition, or alternatively, the gNB may configure a scaling factor to be used in conjunction with the configured number of PUCCH repetitions to obtain a value of the minimum duration before a DL assignment for HARQ retransmission is expected by the MAC entity, such as drx-HARQ-RTT-TimerDL. The value may be associated with the configured number of PUCCH repetitions.

As a third example of 1210, certain exemplary embodiments may provide that the network, such as a base station or gNB, may configure a default value for drx-HARQ-RTT-TimerUL, such as drx-HARQ-RTT-TimerUL-default, and a default value for drx-HARQ-RTT-TimerDL, such as drx-HARQ-RTT-TimerDL-default. In addition, or alternatively, the gNB may configure at least one scaling factor in conjunction with the configured number of repetitions to be used for scaling drx-HARQ-RTT-TimerUL or drx-HARQ-RTT-TimerDL. The value may be associated with the configured number of repetitions.

The method of FIG. 12 may also include, at 1220, scheduling, by the gNB, a PUSCH transmission with repetitions or a PDSCH transmission with the corresponding PUCCH carrying HARQ-ACK transmitted with repetitions. The number of PUSCH or PUCCH repetitions may be dynamically indicated by the gNB.

At 1230, the method may include determining, by a UE, the number of repetitions for PUSCH or PUCCH, as indicated in procedure 1220. When the first example of procedure 1210 described above is implemented, the UE may determine the corresponding value for drx-HARQ-RTT-TimerUL (or drx-HARQ-RTT-TimerDL) thanks to the determined number of PUSCH repetitions (or PUCCH repetitions). When the second example of procedure 1210 described above is implemented, the UE may determine the corresponding value for drx-HARQ-RTT-TimerUL or drx-HARQ-RTT-TimerDL due to the determined number of PUSCH repetitions or PUCCH repetitions and the associated scaling factor. For example, the UE may determine drx-HARQ-RTT-TimerUL or drx-HARQ-RTT-TimerDL by: drx-HARQ-RTT-TimerUL=scaling factor×number of PUSCH repetitions and/or drx-HARQ-RTT-TimerDL=scaling factor×number of PUCCH repetitions. The scaling factor may be indicative of a timer associated with the number of repetitions. For example, drx-HARQ-RTT-TimerUL=number of PUSCH repetitions drx-HARQ-RTT-TimerUL-default and/or drx-HARQ-RTT-TimerDL=number of PUCCH repetitions drx-HARQ-RTT-TimerDL-default. The drx-HARQ-RTT-TimerDL-default may be a scaling factor.

When the third example of procedure 1210 described above is implemented, the UE may determine drx-HARQ-RTT-TimerUL or drx-HARQ-RTT-TimerDL due to the default value and the at least one scaling factor. As an example, the UE may determine drx-HARQ-RTT-TimerUL or drx-HARQ-RTT-TimerDL by scaling the default value by the scaling factor, such as with rounded (down or up) to a next integer value, which may satisfy: drx-HARQ-RTT-TimerUL=scaling factor×drx-HARQ-RTT-TimerUL-default and/or drx-HARQ-RTT-TimerDL=scaling factor×drx-HARQ-RTT-TimerDL-default. The scaling factor may be inverse proportional to the associated number of repetitions. As another example, different scaling factors may be applied when PUSCH/PUCCH may be counted on physical or consecutive slots compared to when PUSCH/PUCCH may be counted on available slots. The calculation may be based on both physical and available slots, such that the minimum or maximum of the results based the two inputs may be used to determine drx-HARQ-RTT-TimerUL or drx-HARQ-RTT-TimerDL. As a further example, alternatively or in addition to, different scaling factors may be applied when drx-HARQ-RTT-TimerUL starts from the first PUSCH repetition compared to when drx-HARQ-RTT-TimerUL starts from the last PUSCH repetition, such as depending on whether drx-LastTransmissionUL is configured or not.

The method of FIG. 12 may also include, at 1240, transmitting, by the UE, a PUSCH or PUCCH with repetitions. The UE may apply the determined drx-HARQ-RTT-TimerUL and drx-HARQ-RTT-TimerDL for determining inactive and active durations for DRX.

FIG. 13 illustrates a flow diagram of one or more procedures for adapting drx-RetransmissionTimerUL and/or drx-RetransmissionTimerDL, according to various exemplary embodiments. The method may include, at 1310, as a first example, configuring, by the network, such as a base station or gNB, one or a plurality of values for the maximum duration before a UL HARQ retransmission grant is expected by the MAC entity, such as drx-Retransmission-TimerUL). Each value may be associated with at least one number of PUSCH repetitions. The gNB may alternatively or additionally configure one or a plurality of values for the maximum duration before a DL assignment for HARQ retransmission is expected by the MAC entity, such as drx-RetransmissionTimerDL). Each value may be associated with at least one number of PUCCH repetitions.

As a second example of 1310, some exemplary embodiments may provide that the network, such as a base station or gNB, may configure a scaling factor to be used in conjunction with the configured number of PUSCH repetitions to obtain a value of the maximum duration before a UL HARQ retransmission grant is expected by the MAC entity, such as drx-RetransmissionTimerUL). The value may be associated with the configured number of PUSCH repetitions. In addition or alternatively, the gNB may configure a scaling factor to be used in conjunction with the configured number of PUCCH repetitions to obtain a value of the maximum duration before a DL assignment for HARQ retransmission is expected by the MAC entity, such as drx-RetransmissionTimerDL). The value may be associated with the configured number of PUCCH repetitions.

As a third example of 1310, some exemplary embodiments may provide that the network, such as a base station or gNB, may configure a default value for drx-RetransmissionTimerUL, such as drx-RetransmissionTimerUL-default) and one default value for drx-RetransmissionTimerDL (drx-RetransmissionTimerDL-default). In addition, or alternatively, the gNB may configure at least one scaling factor in conjunction with the configured number of repetitions to be used for scaling drx-RetransmissionTimerUL or drx-RetransmissionTimerDL. The value may be associated with the configured number of repetitions.

The method of FIG. 13 may also include, at 1320, scheduling, by the gNB, a PUSCH transmission with repetitions or a PDSCH transmission with the corresponding PUCCH carrying HARQ-ACK transmitted with repetitions. The number of PUSCH or PUCCH repetitions may be dynamically indicated by the gNB.

At 1330, the method may include determining, by the UE, the number of repetitions for PUSCH or PUCCH indicated, for example, in Step 1320. When the first example of procedure 1310 described above is implemented, the UE may determine the corresponding value for drx-RetransmissionTimerUL or drx-RetransmissionTimerDL due to the determined number of PUSCH repetitions or PUCCH repetitions. When the second example of procedure 1310 described above is implemented, the UE may determine the corresponding value for drx-RetransmissionTimerUL or drx-RetransmissionTimerDL due to the determined number of PUSCH repetitions or PUCCH repetitions and the associated scaling factor. The UE may determine drx-RetransmissionTimerUL or drx-RetransmissionTimerDL by drx-RetransmissionTimerUL=scaling factor×number of PUSCH repetitions and/or drx-RetransmissionTimerDL=scaling factor×number of PUCCH repetitions. The scaling factor may be indicative of a timer associated with the number of repetitions. When the third example of procedure 1310 described above is implemented, the UE may determine drx-RetransmissionTimerUL or drx-RetransmissionTimerDL due to the default value and the at least one scaling factor. For example, the UE may determine drx-RetransmissionTimerUL or drx-RetransmissionTimerDL by scaling the default value by the scaling factor, such as by rounding down or up to a next integer value and to satisfy: drx-RetransmissionTimerUL=scaling factor×drx-RetransmissionTimerUL-default, and/or drx-RetransmissionTimerDL=scaling factor×drx-RetransmissionTimerDL-default. The scaling factor may be proportional to its associated number of repetitions. In addition, or alternatively, different scaling factors may be applied when a PUSCH and/or a PUCCH may be counted on physical or consecutive slots as compared to the case when a PUSCH and/or a PUCCH may be counted on available slots. When the calculation is based on both physical and available slots, the minimum or maximum of the results based the two inputs may be used to determine drx-RetransmissionTimerUL or drx-RetransmissionTimerDL. In addition, or alternatively, different scaling factors may be applied when drx-RetransmissionTimerUL starts from the first PUSCH repetition compared to when drx-RetransmissionTimerUL starts from the last PUSCH repetition, such as depending on whether drx-LastTransmissionUL is configured or not.

The method of FIG. 13 may also include, at 1340, transmitting, by the UE, a PUSCH or PUCCH with repetitions. The UE may apply the determined drx-RetransmissionTimerUL and drx-RetransmissionTimerDL for determining inactive and active durations for DRX.

FIG. 14 illustrates an example flow diagram of a method, according to certain exemplary embodiments. In an example embodiment, the method of FIG. 14 may be performed by a network element, or a group of multiple network elements in a 3GPP system, such as LTE or 5G-NR. For instance, in an exemplary embodiment, the method of FIG. 14 may be performed by a user equipment, user device, or mobile device connected to the network, such as a UE similar to apparatus 1610 illustrated in FIG. 16.

According to various exemplary embodiments, the method of FIG. 14 may include, at 1410, receiving, from a network entity similar to apparatus 1620, an indication of a number of repetitions of an uplink control channel. At 1420, the method further includes determining at least one duration of at least one timer based on at least the number of repetitions, and at 1430, transmitting the uplink channel with the number of repetitions and starting the timer. At 1440, the method may also include determining, upon an expiration status of the at least one timer, a discontinuous reception state of the apparatus 1610 including a plurality of active and inactive states.

Various exemplary embodiments may provide the at least one duration of the at least one timer may be configured by the network entity, and the at least one duration of the at least one timer may be configured to be different for each different number of repetitions. Further, the at least one duration of the at least one timer may based on at least one default time duration configured by the network entity and at least one scaling factor associated with the number of repetitions. The at least one scaling factor may be proportional or inversely proportional to the associated number of repetitions. The scaling factor may be applied for scaling the default time duration. The scaling factor may be applied for scaling the default time duration when the number of repetitions exceeds a predefined threshold.

Some exemplary embodiments provide that the scaling factor to be applied in case the repetitions is counted on physical slots may be different from the scaling factor to be applied in case the repetitions are counted on available slots. Further, the scaling factor to be applied in case the at least one timer starts from the first repetition may be different from the scaling factor to be applied in case the at least one timer starts from the last repetition. The uplink channel may be a physical uplink shared channel or a physical uplink control channel.

Figure 15:
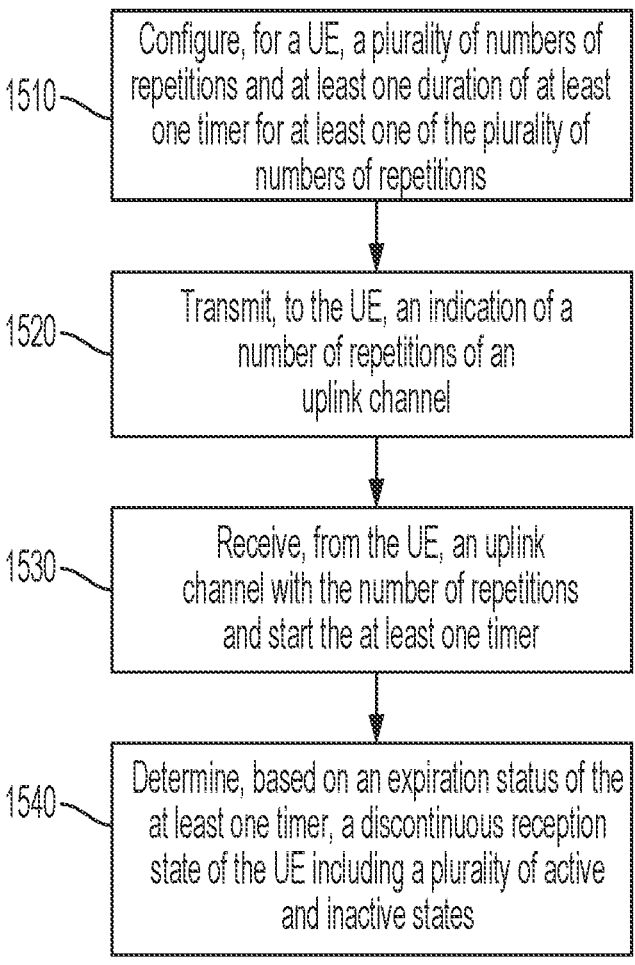
FIG. 15 illustrates an example of a flow diagram of another method, according to certain exemplary embodiments.

FIG. 15 illustrates an example flow diagram of a method, according to certain exemplary embodiments. In an example embodiment, the method of FIG. 15 may be performed by a network element, or a group of multiple network elements in a 3GPP system, such as LTE or 5G-NR. For instance, in an exemplary embodiment, the method of FIG. 15 may be performed by a network or network entity, such as a base station or gNB, similar to apparatus 1620 illustrated in FIG. 16.

According to various exemplary embodiments, the method of FIG. 15 may include, at 1510, configuring, for a UE similar to apparatus 1610, a plurality of numbers of repetitions and at least one duration of at least one timer for at least one of the plurality of numbers of repetitions. At 1520, the method may include transmitting, to the UE, an indication of a number of repetitions of an uplink channel, and at 1530, the method may perform receiving, from the UE, the uplink channel with the number of repetitions and start the at least one timer. At 1540, the method may include determining, based on an expiration status of the at least one timer, a discontinuous reception state of the user equipment including a plurality of active and inactive states.

Some exemplary embodiments may provide that the method further includes determining at least one value for a minimum or maximum duration based on a duration before an uplink retransmission grant is expected by the user equipment or determining at least one value for the minimum or maximum duration based on a duration before a downlink assignment for retransmission is expected by the user equipment.

Certain exemplary embodiments of the method of FIG. 15 may also include configuring a scaling factor for the at least one timer based on the number of repetitions. The exemplary method may further include dynamically indicating the number of repetitions to the user equipment.

Figure 16:
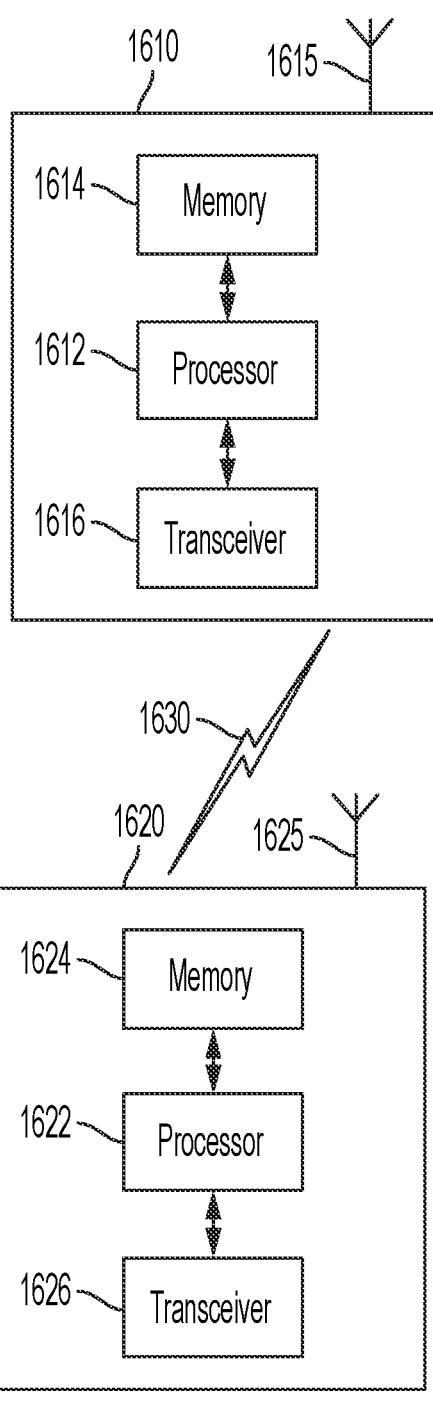
FIG. 16 illustrates a set of apparatuses, according to various exemplary embodiments.

FIG. 16 illustrates a set of apparatuses 1610 and 1620 according to various exemplary embodiments. In the various exemplary embodiments, the apparatus 1610 may be an element in a communications network or associated with such a network, such as a UE, RedCap UE, SL UE, mobile equipment (ME), mobile station, mobile device, stationary device, IoT device, or other device. For example, the UE 902 according to various exemplary embodiments discussed above may be an example of apparatus 1610. It should be noted that one of ordinary skill in the art would understand that apparatus 1610 may include components or features not shown in FIG. 16. In addition, apparatus 1620 may be a network, network entity, element of the core network, or element in a communications network or associated with such a network, such as a base station, an NE, or a gNB. For example, the gNB 901 according to various exemplary embodiments as discussed above may be an example of apparatus 1620. It should be noted that one of ordinary skill in the art would understand that apparatus 1620 may include components or features not shown in FIG. 16. It should be noted that one of ordinary skill in the art would understand that apparatus 1620 may include components or features not shown in FIG. 16.

According to various exemplary embodiments, the apparatus 1610 may include at least one processor, and at least one memory, as shown in FIG. 16. The memory may store instructions that, when executed by the processor, cause the apparatus 1610 to receive, from a network entity, an indication of a number of repetitions of an uplink channel, and determine at least one duration of at least one timer based on at least the number of repetitions. The apparatus 1610 may also be caused to transmit the uplink channel with the number of repetitions and start the timer and determine, based on an expiration status of the at least one timer, a discontinuous reception state of the apparatus comprising a plurality of active and inactive states.

According to various exemplary embodiments, the apparatus 1620 may include at least one processor, and at least one memory, as shown in FIG. 16. The memory may store instructions that, when executed by the processor, cause the apparatus 1620 to configure, for a UE, a plurality of numbers of repetitions and at least one duration of at least one timer for at least one of the plurality of numbers of repetitions and transmit, to the UE, an indication of a number of repetitions of an uplink channel. The apparatus 1620 may be further caused to receive, from the user equipment, the uplink channel with the number of repetitions and start the at least one timer and determine, based on an expiration status of the at least one timer, a discontinuous reception state of the user equipment including a plurality of active and inactive states.

Various exemplary embodiments described above may provide several technical improvements, enhancements, and/or advantages. For instance, some exemplary embodiments may provide advantages of one or more procedures to provide a more balanced consideration for UE power saving and latency reduction with respect to the minimum or maximum duration before a UL HARQ retransmission grant is expected. Certain exemplary embodiments may allow for avoiding delaying retransmissions while waiting for active time, in which, the minimum time until retransmission scheduling with repetitions may be shorter due to the higher delay criticality as compared to the case without repetitions. An extra or early active time transition may be avoid for the no repetition case as compared to when the active time would need to start earlier than needed for the retransmission without repetitions case, because the minimum time until retransmission scheduling may be longer where no repetitions due to the lower delay criticality without repetitions. Extra active time during drx-RetransmissionTimerDL/drx-RetransmissionTimerUL may be avoid for when there is no repetitions. If only using conventional means, the active time would need to extend longer than needed for the retransmission without repetitions case, because the maximum time until retransmission scheduling may be shorter where no repetitions due to the reduced scheduling limitations without repetitions.

Some exemplary embodiments may avoid missing retransmissions where the maximum time until retransmission scheduling with repetitions may be longer due to the additional scheduling limitations as compared to the case without repetitions.

In some example embodiments, apparatuses 1610 and/or 1620 may include one or more processors, one or more computer-readable storage medium (for example, memory, storage, or the like), one or more radio access components (for example, a modem, a transceiver, or the like), and/or a user interface. In some example embodiments, apparatuses 1610 and/or 1620 may be configured to operate using one or more radio access technologies, such as GSM, LTE, LTE-A, NR, 5G, WLAN, WiFi, NB-IoT, Bluetooth, NFC, MulteFire, and/or any other radio access technologies.

As illustrated in the example of FIG. 16, apparatuses 1610 and/or 1620 may include or be coupled to processors 1612 and 1622, respectively, for processing information and executing instructions or operations. Processors 1612 and 1622 may be any type of general or specific purpose processor. In fact, processors 1612 and 1622 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 1612 (and 1622) for each of apparatuses 1610 and/or 1620 is shown in FIG. 16, multiple processors may be utilized according to other example embodiments. For example, it should be understood that, in certain example embodiments, apparatuses 1610 and/or 1620 may include two or more processors that may form a multiprocessor system (for example, in this case processors 1612 and 1622 may represent a multiprocessor) that may support multiprocessing. According to certain example embodiments, the multiprocessor system may be tightly coupled or loosely coupled to, for example, form a computer cluster).

Processors 1612 and 1622 may perform functions associated with the operation of apparatuses 1610 and/or 1620, respectively, including, as some examples, precoding of antenna gain/phase parameters, encoding and decoding of individual bits forming a communication message, formatting of information, and overall control of the apparatuses 1610 and/or 1620, including processes illustrated in FIGS. 7A-16.

Apparatuses 1610 and/or 1620 may further include or be coupled to memory 1614 and/or 1624 (internal or external), respectively, which may be coupled to processors 1612 and 1622, respectively, for storing information and instructions that may be executed by processors 1612 and 1622. Memory 1614 (and memory 1624) may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 1614 (and memory 1624) can be comprised of any combination of random access memory (RAM), read only memory (ROM), static storage such as a magnetic or optical disk, hard disk drive (HDD), or any other type of non-transitory machine or computer readable media. The instructions stored in memory 1614 and memory 1624 may include program instructions or computer program code that, when executed by processors 1612 and 1622, enable the apparatuses 1610 and/or 1620 to perform tasks as described herein. In certain example embodiments, apparatuses 1610 and/or 1620 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 1612 and 1622 and/or apparatuses 1610 and/or 1620 to perform any of the methods illustrated in FIGS. 7A-16.

In some exemplary embodiments, apparatuses 1610 and/or 1620 may also include or be coupled to one or more antennas 1615 and 1625 for receiving a downlink signal and for transmitting via an uplink from apparatus 1610 and apparatus 1620, respectively. Apparatuses 1610 and/or 1620 may further include transceivers 1616 and 1626, respectively, configured to transmit and receive information. The transceiver 1616 and 1626 may also include a radio interface that may correspond to a plurality of radio access technologies including one or more of GSM, LTE, LTE-A, 5G, NR, WLAN, NB-IoT, Bluetooth, BT-LE, NFC, RFID, UWB, or the like. The radio interface may include other components, such as filters, converters (for example, digital-to-analog converters or the like), symbol demappers, signal shaping components, an Inverse Fast Fourier Transform (IFFT) module, or the like, to process symbols, such as OFDMA symbols, carried by a downlink or an uplink.

For instance, transceivers 1616 and 1626 may be respectively configured to modulate information on to a carrier waveform for transmission, and demodulate received information for further processing by other elements of apparatuses 1610 and/or 1620. In other example embodiments, transceivers 1616 and 1626 may be capable of transmitting and receiving signals or data directly. Additionally or alternatively, in some example embodiments, apparatuses 1610 and/or 1620 may include an input and/or output device (I/O device). In certain example embodiments, apparatuses 1610 and/or 1620 may further include a user interface, such as a graphical user interface or touchscreen.

In certain example embodiments, memory 1614 and memory 1624 store software modules that provide functionality when executed by processors 1612 and 1622, respectively. The modules may include, for example, an operating system that provides operating system functionality for apparatuses 1610 and/or 1620. The memory may also store one or more functional modules, such as an application or program, to provide additional functionality for apparatuses 1610 and/or 1620. The components of apparatuses 1610 and/or 1620 may be implemented in hardware, or as any suitable combination of hardware and software. According to certain example embodiments, apparatus 1610 may optionally be configured to communicate with apparatus 1620 via a wireless or wired communications link 1630 according to any radio access technology, such as NR.

According to certain example embodiments, processors 1612 and 1622, and memory 1614 and 1624 may be included in or may form a part of processing circuitry or control circuitry. In addition, in some example embodiments, transceivers 1616 and 1626 may be included in or may form a part of transceiving circuitry.

In some exemplary embodiments, an apparatus (e.g., apparatus 1610 and/or apparatus 1620) may include means for performing a method, a process, or any of the variants discussed herein. Examples of the means may include one or more processors, memory, controllers, transmitters, receivers, and/or computer program code for causing the performance of the operations.

Certain exemplary embodiments may be directed to an apparatus that includes means for receiving, from a network entity, an indication of a number of repetitions of an uplink channel and means for determining at least one duration of at least one timer based on at least the number of repetitions. The apparatus may also include means for transmitting the uplink channel with the number of repetitions and start the timer and means for determining, based on an expiration status of the at least one timer, a discontinuous reception state of the apparatus including a plurality of active and inactive states.

Other exemplary embodiments may be directed to an apparatus that includes means for configuring, for a UE, a plurality of numbers of repetitions and at least one duration of at least one timer for at least one of the plurality of numbers of repetitions, and means for transmitting, to the UE, an indication of a number of repetitions of an uplink channel. The apparatus may also include means for receiving, from the user equipment, the uplink channel with the number of repetitions and start the at least one timer and means for determining, based on an expiration status of the at least one timer, a discontinuous reception state of the user equipment comprising a plurality of active and inactive states.

As used herein, the term "circuitry" may refer to hardware-only circuitry implementations (for example, analog and/or digital circuitry), combinations of hardware circuits and software, combinations of analog and/or digital hardware circuits with software/firmware, any portions of hardware processor(s) with software, including digital signal processors, that work together to cause an apparatus (for example, apparatus 1610 and/or 1620) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor or multiple processors, or portion of a hardware circuit or processor, and the accompanying software and/or firmware. The term circuitry may also cover, for example, a baseband integrated circuit in a server, cellular network node or device, or other computing or network device.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (for example, apparatuses 1610 and/or 1620), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

21

Partial Glossary

3GPP 3rd Generation Partnership Project
5G 5th Generation
ACK Acknowledgement
DCI Downlink Control Information
DL Downlink
DRX Discontinuous Reception
EMBB Enhanced Mobile Broadband
gNB 5G or Next Generation NodeB
HARQ Hybrid Automatic Repeat Request
LTE Long Term Evolution
MAC Medium Access Control
NACK Non-acknowledgement
NR New Radio
PDCCH Physical Downlink Control Channel
PDSCH Physical Downlink Shared Channel
PDU Protocol Data Unit
PUCCH Physical Uplink Control Channel
PUSCH Physical Uplink Shared Channel
RAN Radio Access Network
RedCap Reduced Capability
RF Radio Frequency
RRC Radio Resource Control
RV Redundancy Version
SLIV Start and Length Indicator Value
TBS Transport Block Size
TDRA Time Domain Resource Assignment
UE User Equipment
UL Uplink
URLLC Ultra Reliable Low Latency Communication
WUR Wake-Up Receiver
WUS Wake-Up Signal

We claim:

1. An apparatus configured as a user equipment, comprising:

at least one processor; and at least one memory storing instructions that, when executed by the at least one processor, cause the apparatus to:

receive, from a base station via downlink control information, an explicit indication of a number of repetitions for a physical uplink shared channel transmission scheduled for a hybrid automatic repeat request (HARQ) process;

determine that a last-transmission indicator for uplink repetitions is configured for the user equipment;

based on the indicated number of repetitions and the last-transmission indicator being configured, determine a value of a drx-HARQ-RTT-TimerUL by:

selecting one of a plurality of timer values pre-configured by the base station, wherein each timer value is uniquely associated with a respective number of uplink repetitions, and wherein the selected timer value is shorter for a larger number of repetitions and longer for a smaller number of repetitions;

transmit the physical uplink shared channel using the indicated number of repetitions;

start the drx-HARQ-RTT-TimerUL from a first symbol following a last repetition of the physical uplink shared channel;

refrain from monitoring a physical downlink control channel while the drx-HARQ-RTT-TimerUL is running;

22 upon expiration of the drx-HARQ-RTT-TimerUL, transition the apparatus from a discontinuous reception inactive state to a discontinuous reception active state; and monitor the physical downlink control channel during the discontinuous reception active state for a retransmission grant corresponding to the HARQ process.

2. The apparatus of claim 1, wherein the plurality of timer values pre-configured by the base station is provided to the apparatus via radio resource control (RRC) signaling as a table that maps each supported number of uplink repetitions to a corresponding drx-HARQ-RTT-TimerUL value.

3. The apparatus of claim 2, wherein the table includes entries for at least three different numbers of uplink repetitions, and wherein the drx-HARQ-RTT-TimerUL values decrease monotonically as the number of uplink repetitions increases.

4. The apparatus of claim 3, wherein the apparatus is further caused to determine the drx-HARQ-RTT-TimerUL by applying an offset to a default drx-HARQ-RTT-TimerUL value configured by the base station, the offset being selected based on the indicated number of uplink repetitions.

5. The apparatus of claim 4, wherein the offset is subtracted from the default drx-HARQ-RTT-TimerUL value when the indicated number of uplink repetitions exceeds a predefined repetition threshold.

6. The apparatus of claim 5, wherein the apparatus is further caused to determine the drx-HARQ-RTT-TimerUL by scaling a default drx-HARQ-RTT-TimerUL value using a scaling factor associated with the indicated number of uplink repetitions.

7. The apparatus of claim 6, wherein the scaling factor is inversely proportional to the indicated number of uplink repetitions.

8. The apparatus of claim 7, wherein the indicated number of uplink repetitions is counted based on available transmission slots, and wherein the determined drx-HARQ-RTT-TimerUL is selected based on the counting of available transmission slots.

9. The apparatus of claim 8, wherein the apparatus is further caused to:

determine a drx-RetransmissionTimerUL based on the indicated number of uplink repetitions; and monitor the physical downlink control channel for the retransmission grant during a duration defined by the drx-RetransmissionTimerUL.

10. The apparatus of claim 9, wherein the drx-RetransmissionTimerUL is longer for a higher number of uplink repetitions than for a lower number of uplink repetitions.

11. A method performed by an apparatus, the method comprising:

receiving, from a base station via downlink control information, an explicit indication of a number of repetitions for a physical uplink shared channel transmission scheduled for a hybrid automatic repeat request (HARQ) process;

determining that a last-transmission indicator for uplink repetitions is configured for the user equipment;

based on the indicated number of repetitions and the last-transmission indicator being configured, determining a value of a drx-HARQ-RTT-TimerUL by:

selecting one of a plurality of timer values pre-configured by the base station, wherein each timer value is uniquely associated with a respective number of uplink repetitions, and wherein the selected timer value is shorter for a larger number of repetitions and longer for a smaller number of repetitions;

transmitting the physical uplink shared channel using the indicated number of repetitions;

starting the drx-HARQ-RTT-TimerUL from a first symbol following a last repetition of the physical uplink shared channel;

refraining from monitoring a physical downlink control channel while the drx-HARQ-RTT-TimerUL is running;

upon expiration of the drx-HARQ-RTT-TimerUL, transitioning the apparatus from a discontinuous reception inactive state to a discontinuous reception active state; and monitoring the physical downlink control channel during the discontinuous reception active state for a retransmission grant corresponding to the HARQ process.

12. The apparatus of claim 11, wherein the plurality of timer values pre-configured by the base station is provided to the apparatus via radio resource control (RRC) signaling as a table that maps each supported number of uplink repetitions to a corresponding drx-HARQ-RTT-TimerUL value.

13. The method of claim 12, wherein the table includes entries for at least three different numbers of uplink repetitions, and wherein the drx-HARQ-RTT-TimerUL values decrease monotonically as the number of uplink repetitions increases.

14. The method of claim 13, further comprising determining the drx-HARQ-RTT-TimerUL by applying an offset to a default drx-HARQ-RTT-TimerUL value configured by the base station, the offset being selected based on the indicated number of uplink repetitions.

15. The method of claim 14, wherein the offset is subtracted from the default drx-HARQ-RTT-TimerUL value when the indicated number of uplink repetitions exceeds a predefined repetition threshold.

16. The method of claim 15, further comprising determining the drx-HARQ-RTT-TimerUL by scaling a default drx-HARQ-RTT-TimerUL value using a scaling factor associated with the indicated number of uplink repetitions.

17. The method of claim 16, wherein the scaling factor is inversely proportional to the indicated number of uplink repetitions.

18. The method of claim 17, wherein the indicated number of uplink repetitions is counted based on available transmission slots, and wherein the determined drx-HARQ-RTT-TimerUL is selected based on the counting of available transmission slots.

19. The method of claim 18, further comprising:

determining a drx-RetransmissionTimerUL based on the indicated number of uplink repetitions; and monitoring the physical downlink control channel for the retransmission grant during a duration defined by the drx-RetransmissionTimerUL.

20. The method of claim 19, wherein the drx-RetransmissionTimerUL is longer for a higher number of uplink repetitions than for a lower number of uplink repetitions.

* * * * *